US010795979B2

(12) United States Patent
Chan et al.

(10) Patent No.: US 10,795,979 B2
(45) Date of Patent: Oct. 6, 2020

(54) ESTABLISHING PERSONAL IDENTITY AND USER BEHAVIOR BASED ON IDENTITY PATTERNS

(71) Applicant: International Business Machines Corporation, Armonk, NY (US)

(72) Inventors: Yuk L. Chan, Rochester, NY (US); Deepti M. Naphade, Cupertino, CA (US); Tin Hang To, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/716,665

(22) Filed: Sep. 27, 2017

(65) Prior Publication Data

US 2019/0095601 A1 Mar. 28, 2019

(51) Int. Cl.
*G06F 21/32* (2013.01)
*G06K 9/00* (2006.01)
(Continued)

(52) U.S. Cl.
CPC ............ *G06F 21/32* (2013.01); *G06F 21/316* (2013.01); *G06K 9/00261* (2013.01);
(Continued)

(58) Field of Classification Search
None
See application file for complete search history.

(56) References Cited

U.S. PATENT DOCUMENTS 6,418,235 B1 7/2002 Morimoto et al.
7,942,318 B2 5/2011 Abraham
(Continued)

FOREIGN PATENT DOCUMENTS

AU 2011101355 A4 12/2011
CN 104933710 A 9/2015
(Continued)

OTHER PUBLICATIONS

Chan et al., "Establishing Personal Identity Using Real Time Contextual Data", U.S. Appl. No. 15/716,640, filed Sep. 27, 2017, 77 pages.
(Continued)

*Primary Examiner* — Bernard Krasnic
(74) *Attorney, Agent, or Firm* — Jose A. Medina-Cruz; William H. Hartwell

(57) ABSTRACT

In an approach to establishing personal identity using user identity patterns, one or more processors receive a set of input images corresponding to a period of time, where each input image in the set of input images corresponds to a specific time within the period of time. One or more processors may also identify a first user in the set of input images and determining, a user identity pattern based on the set of input images, where the user identity pattern includes multiple instances of at least one physical characteristic of the first user over the period of time. One or more processors may further determine a user behavior based on the user identity pattern. One or more processors may additionally associate the set of input images and the user identity pattern with a first user profile for the first user.

9 Claims, 23 Drawing Sheets

(51) Int. Cl.
- *G06F 21/31* (2013.01)
- *H04L 29/08* (2006.01)
- *H04W 4/029* (2018.01)

(52) U.S. Cl.
CPC ..... *G06K 9/00288* (2013.01); *G06K 9/00335* (2013.01); *G06K 9/00369* (2013.01); *H04L 67/22* (2013.01); *H04L 67/306* (2013.01); *H04W 4/029* (2018.02)

(56) References Cited

U.S. PATENT DOCUMENTS

| | | | |
|---|---|---|---|
| 8,055,546 | B1 | 11/2011 | Cassone |
| 8,412,932 | B2 | 4/2013 | Schneider |
| 8,850,536 | B2 | 9/2014 | Liberman |
| 9,082,011 | B2 | 7/2015 | Komogortsev |
| 9,111,290 | B2 | 8/2015 | Delgado et al. |
| 9,118,735 | B1 | 8/2015 | McInerny et al. |
| 9,147,117 | B1 | 9/2015 | Madhu et al. |
| 9,160,743 | B2 | 10/2015 | Anantharaman |
| 9,208,177 | B2 | 12/2015 | Petrou et al. |
| 9,418,491 | B2 | 8/2016 | Phillips |
| 9,531,998 | B1 | 12/2016 | Farrell et al. |
| 9,576,135 | B1 | 2/2017 | Komandoor Elayavilli |
| 9,579,135 | B2 | 2/2017 | Cook |
| 10,078,693 | B2 * | 9/2018 | Brown ............... G06F 16/7335 |
| 10,122,764 | B1 | 11/2018 | Obaidi |
| 2002/0176610 | A1 | 11/2002 | Okazaki |
| 2004/0024694 | A1 | 2/2004 | Lawrence |
| 2005/0015300 | A1 | 1/2005 | Smith |
| 2006/0182361 | A1 | 8/2006 | Ptucha |
| 2007/0294207 | A1 * | 12/2007 | Brown ............... G06F 16/7335 |
| 2008/0168052 | A1 | 7/2008 | Ott, IV |
| 2008/0298643 | A1 * | 12/2008 | Lawther ............. G06K 9/00288 |
| | | | 382/118 |
| 2008/0304749 | A1 | 12/2008 | Ogawa |
| 2009/0087036 | A1 | 4/2009 | Imaoka |
| 2009/0254971 | A1 | 10/2009 | Herz |
| 2009/0271493 | A1 | 10/2009 | Boucard |
| 2009/0316962 | A1 | 12/2009 | Sun |
| 2010/0082684 | A1 * | 4/2010 | Churchill ........... G06F 16/9535 |
| | | | 707/784 |
| 2010/0257131 | A1 | 10/2010 | Kim |
| 2010/0316265 | A1 | 12/2010 | Nakanowatari |
| 2011/0166869 | A1 | 7/2011 | Froelich |
| 2011/0243465 | A1 | 10/2011 | Lin |
| 2012/0114177 | A1 | 5/2012 | Adachi |
| 2012/0189207 | A1 | 7/2012 | Doretto |
| 2013/0007126 | A1 | 1/2013 | Ziemann |
| 2013/0073473 | A1 | 3/2013 | Heath |
| 2013/0077835 | A1 | 3/2013 | Kritt et al. |
| 2013/0170738 | A1 | 7/2013 | Capuozzo et al. |
| 2013/0227700 | A1 | 8/2013 | Dhillon |
| 2013/0262215 | A1 | 10/2013 | Guay |
| 2014/0003674 | A1 | 1/2014 | Coley |
| 2014/0015967 | A1 | 1/2014 | Moore et al. |
| 2014/0022329 | A1 | 1/2014 | Kim |
| 2014/0129942 | A1 | 5/2014 | Rathod |
| 2014/0193047 | A1 | 7/2014 | Grosz et al. |
| 2014/0194196 | A1 * | 7/2014 | Hoy ........................ A63F 13/10 |
| | | | 463/29 |
| 2014/0207518 | A1 | 7/2014 | Kannan |
| 2014/0278903 | A1 | 9/2014 | Wang |
| 2014/0333413 | A1 * | 11/2014 | Kursun ............. G06K 9/00892 |
| | | | 340/5.52 |
| 2014/0337089 | A1 | 11/2014 | Tavares |
| 2014/0341440 | A1 | 11/2014 | Walch |
| 2014/0365334 | A1 | 12/2014 | Hurewitz |
| 2015/0042663 | A1 | 2/2015 | Mandel |
| 2015/0078680 | A1 | 3/2015 | Shakib et al. |
| 2015/0084984 | A1 | 3/2015 | Tomii |
| 2015/0169898 | A1 | 6/2015 | Lembcke |
| 2015/0269642 | A1 | 9/2015 | Cai et al. |
| 2015/0324563 | A1 | 11/2015 | Deutschmann |
| 2015/0324698 | A1 | 11/2015 | Karaoguz |
| 2015/0363636 | A1 * | 12/2015 | Tate |
| 2016/0065539 | A1 * | 3/2016 | Mermelstein ......... H04L 63/107 |
| | | | 726/7 |
| 2016/0078302 | A1 | 3/2016 | Kanga et al. |
| 2016/0110585 | A1 | 4/2016 | Govindaraj et al. |
| 2016/0232402 | A1 | 8/2016 | Jiang |
| 2016/0292700 | A1 | 10/2016 | Gopal et al. |
| 2017/0017834 | A1 | 1/2017 | Sabitov et al. |
| 2017/0255273 | A1 | 9/2017 | Yuen |
| 2018/0068028 | A1 * | 3/2018 | Thirugnanasundaram .................. |
| | | | G06Q 30/0201 |
| 2018/0075291 | A1 | 3/2018 | Tian |
| 2018/0107880 | A1 * | 4/2018 | Danielsson ............. G06T 7/292 |
| 2018/0225622 | A1 | 8/2018 | Factor |
| 2019/0042835 | A1 | 2/2019 | Mostafa |
| 2019/0042866 | A1 | 2/2019 | Mostafa |
| 2019/0095601 | A1 | 3/2019 | Chan |
| 2019/0102531 | A1 | 4/2019 | Li |

FOREIGN PATENT DOCUMENTS

| | | |
|---|---|---|
| EP | 2557524 A1 | 2/2013 |
| WO | 2013192199 A1 | 12/2013 |

OTHER PUBLICATIONS

Chan et al., "Determining Quality of Images for User Identification", U.S. Appl. No. 15/716,651, filed Sep. 27, 2017, 77 pages.

Chan et al., "Passively Managed Loyalty Program Using Customer Images and Behaviors", U.S. Appl. No. 15/716,674, filed Sep. 27, 2017, 77 pages.

IBM, Appendix P, List of IBM Patents or Patent Applications Treated as Related, dated Sep. 28, 2017, 2 pages.

Chan et al., "Establishing Personal Identity Based on Multiple Sub-Optimal Images", U.S. Appl. No. 15/825,522, filed Nov. 29, 2017, 32 pages.

IBM, Appendix P, List of IBM Patents or Patent Applications Treated as Related, dated Dec. 1, 2017, 2 pages.

Bernstein, Shelley "The Realities of Installing iBeacon to Scale", BKM Tech, Feb. 4, 2015, 16 pages, <https://www.brooklynmuseum.org/community/blogosphere/2015/02/04/the-realities-of-installing-ibeacon-to-scale/>.

Chip, "Facebook Save Game Data", Troubles and Solutions—King of Thieves, started Apr. 1, 2016, printed on Jun. 30, 2017, 1 page, <http://forum.kingofthieves.com/topic/20704-facebook-save-game-data/>.

Davis et al., "Towards Context-Aware Face Recognition", MM'05, Nov. 6-11, 2005, Singapore, ACM 1-59593-044-2/05/0011, 4 pages, Copyright is held by the author/owner(s).

Leon, Harmon, "How 5 brands have used facial recognition technology", Digiday, Sep. 7, 2015, 4 pages, <https://digiday.com/marketing/5-campaigns-used-facial-recognition-technology/>.

Martin, James A., "6 things marketers need to know about beacons", CIO, Feb. 24, 2016, 5 pages, <http://www.cio.com/article/3037354/marketing/6-things-marketers-need-to-know-about-beacons.html?page=2>.

Minder et al., "Social Network Aggregation Using Face-Recognition", SDoW2011, Social Data on the Web, Proceedings of the 4th International Workshop on Social Data on the Web, in conjunction with the International Semantic Web Conference (ISWC2011), Bonn, Germany, Oct. 23, 2011, 15 pages, <ceur-ws.org/Vol-830/sdow2011_paper 9.pdf>.

Mliki et al., "Face Recognition Through Different Facial Expressions", J Sign Process Syst (2015) 81:433-446, DOI 10.1007/s11265-014-0967-z, Published online: Jan. 17, 2015, © Springer Science+Business Media New York 2015, <http://link.springer.com/article/10.1007/s11265-014-0967-z>.

Nick, "iBeacon and Battery Drain on Phones: A Technical Report", Aislelabs, Jul. 7, 2014, 14 pages, <http://www.aislelabs.com/reports/ibeacon-battery-phones/>.

Soyata et al., "Cloud-Vision: Real-time Face Recognition Using a Mobile-Cloudlet-Cloud Acceleration Architecture", 8 pages, 978-1-4673-2713-8/12, © 2012 IEEE.

(56) References Cited

OTHER PUBLICATIONS

Starr, Michelle, "Facial recognition app matches strangers to online profiles", CNET, Jan. 7, 2014, 3 pages, <https://www.cnet.com/news/facial-recognition-app-matches-strangers-to-online-profiles/>.

Todd, "Stores Using Facial Recognition to Track You . . . What?!", Yes We Coupon and More!, Sep. 28, 2016, 9 pages, <http://yeswecoupon.com/stores-using-facial-recognition-to-track-you-what/>.

Zhang et al., "Beyond Frontal Faces: Improving Person Recognition Using Multiple Cues", pp. 4804-4813, 978-1-4673-6964-0/15, © 2015 IEEE.

"Coupons are Cool, Facial Recognition is Creepy", Coupons in the News, Jul. 12, 2016, 6 pages, <http://couponsinthenews.com/2016/07/12/coupons-are-cool-facial-recognition-is-creepy/>.

\* cited by examiner

ESTABLISHING PERSONAL IDENTITY AND USER BEHAVIOR BASED ON IDENTITY PATTERNS

BACKGROUND OF THE INVENTION

The present invention relates generally to the field of user identification, and more particularly to user identification based on identity patterns.

Computer vision is an interdisciplinary field that aims for computers to analyze and extract, and interpret contents of images and videos. In other words, computer vision attempts to describe the reality (e.g., the identity of a person) based on analysis of one or more images. Computer vision is used widely for tasks such as optical character recognition (OCR), object recognition in retail industry, medical imaging, motion capture, and security (e.g., monitoring pools, highway traffic, etc.). Computer vision is further used for applications such as face detection and visual authentication for computer users.

SUMMARY

Embodiments of the present invention disclose a method, a computer program product, and a system for establishing personal identity using user identity patterns. The method may include one or more processors receiving a set of input images corresponding to a period of time, where each input image in the set of input images corresponds to a specific time within the period of time. The method may also include one or more processors identifying a first user in the set of input images and determining, a user identity pattern based on the set of input images, where the user identity pattern includes multiple instances of at least one physical characteristic of the first user over the period of time. The method may further include one or more processors determining a user behavior based on the user identity pattern. The method may additionally include associating the set of input images and the user identity pattern with a first user profile for the first user.

DETAILED DESCRIPTION

Identifying users walking into locations (e.g., stores, restaurants, or other similar locations) by comparing user biometric data (e.g., data captured with video cameras) with a plurality of social media profiles may be inefficient based on the large number social media profiles available for inspection. In general, passive management of customer loyalty programs using biometric data has been unfeasible due to the difficulty of identifying users by capturing biometric data.

Some embodiments of the present invention provide improved techniques for user identification by: (1) building subsets of social profiles to match contextual, real-time social media data, and static social media data; (2) applying local filtering to a set of input images to improve selection of images for user identification; and (3) matching multiple sub-optimal images of the user to multiple photos in a social media profile.

Some embodiments of the present invention further disclose a passively managed customer loyalty program through the use of social media profiles. In some embodiments, the loyalty program includes the following characteristics: (1) using a shadow profile for customers for which no social media profile is found; (2) using social media profile data at the point of sale (POS); (3) managing customer data online and/or on premise at the retailer using data isolation; (4) performing analytics on the social media profiles; and (5) generating target advertisements.

Implementation of embodiments of the present invention may take a variety of forms, and exemplary implementation details are discussed subsequently with reference to the Figures.

Figure 1:
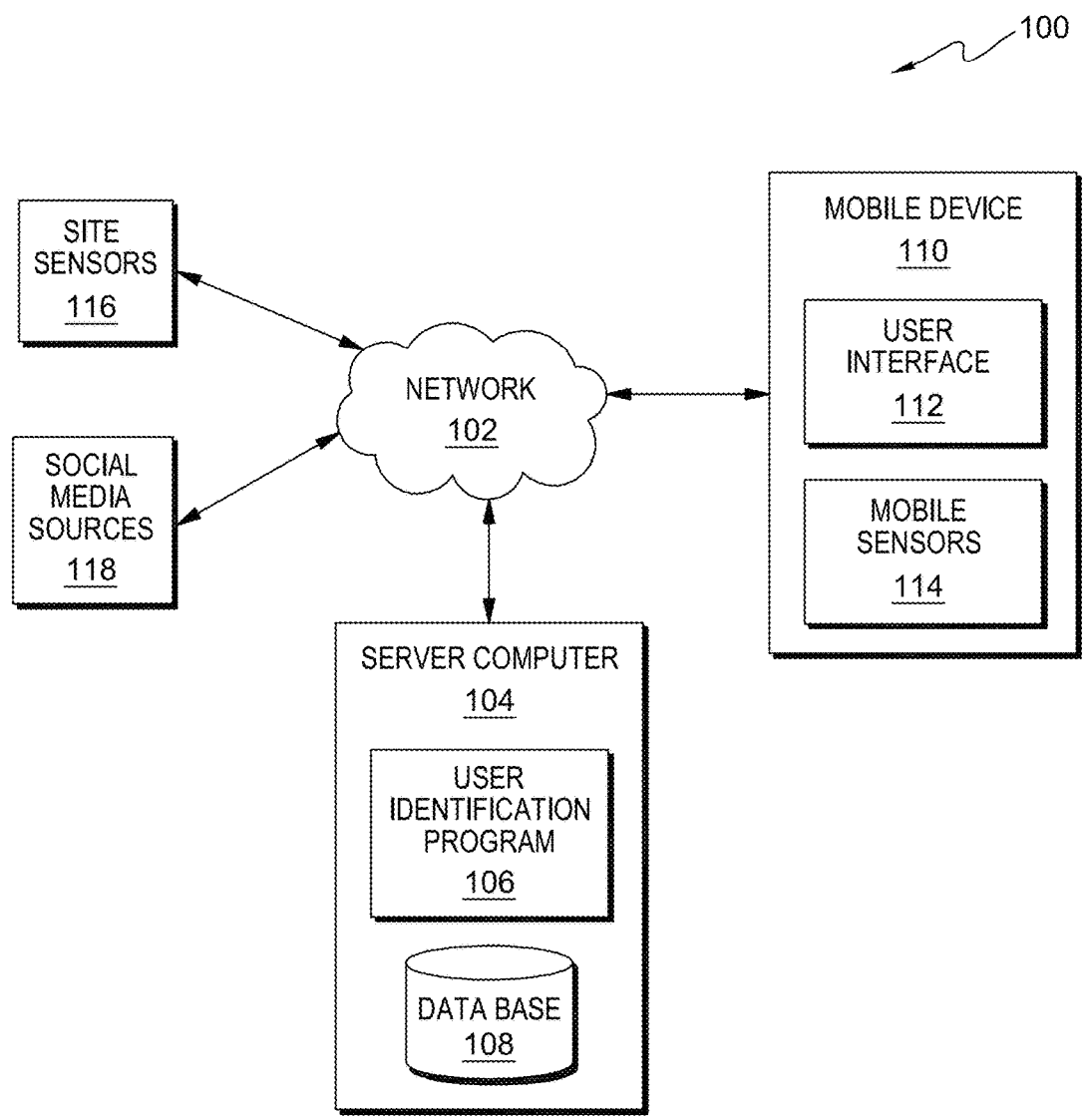
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, mobile device 110, site sensors 116, and social media sources 118, all interconnected over network 102.

In general, network 102 can be any combination of connections and protocols that will support communications between server computer 104, mobile device 110, site sensors 116, and social media sources 118, and other computing devices (not shown) within distributed data processing environment 100. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that can receive and transmit data, voice, and/or video signals, including multimedia signals that include voice, data, and video information.

Server computer 104 can be a standalone computing device, a management server, a content service, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any other programmable electronic device capable of communicating with mobile device 110, site sensors 116, social media sources 118, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 may include internal and external hardware components, as depicted and described in further detail with respect to FIG. 25.

Mobile device 110 enables a user to access social media sources 118 and other websites and applications (not shown). For instance, mobile device 110 can be a laptop computer, a tablet computer, a smart phone, or any programmable electronic mobile device capable of communicating with various components and devices within distributed data processing environment 100, via network 102. In general, mobile device 110 represents any programmable electronic mobile device or combination of programmable electronic mobile devices capable of executing machine readable program instructions and communicating with other computing devices (not shown) within distributed data processing environment 100 via a network, such as network 102. Mobile device 110 includes an instance of user interface 112. Mobile device 110 may include internal and external hardware components, as depicted and described in further detail with respect to FIG. 25.

User interface 112 provides an interface to social media sources 118 for a user of mobile device 110. In some embodiments of the present invention, user interface 112 may be a graphical user interface (GUI) or a web user interface (WUI) and can display text, documents, web browser windows, user options, application interfaces, instructions for operation, and include the information (such as graphic, text, and sound) that a program presents to a user and the control sequences the user employs to control the program. In other embodiments, user interface 112 may also be mobile application software that provides a connection between data generated by a user of mobile device 110 and server computer 104. Mobile application software, or an "app," is a computer program designed to run on smart phones, tablet computers and other mobile devices. In other embodiments, user interface 112 may be an external device operatively connected to mobile device 110 via near field communication or other types of wired and/or wireless technologies.

Mobile device 110 may also provide mobile sensors 114 useful to identify users. Mobile sensors 114 may include cameras, global position system (GPS) sensors, and near-field communication sensors, among others.

Site sensors 116 may include any device from which an identification of a user may be obtained. For example, site sensors 116 may include biometric devices such as video cameras, depth sensors, and other similar devices. Site sensors 116 may also include near-field communication sensors to identify a user via mobile device 110.

Social media sources 118 may include one or a combination of social media websites, focused chat sites or applications, blogs, and wikis, or other content sites. Social media sources 118 may include text, graphics, pictures, and other content posted by users.

Database 108 is a repository for data used by user identification program 106. Data used by user identification program 106 may include user data such as images, identification information, user behaviors, social network data, profile data, and other information useful to determine user identification or behavior. In the depicted embodiment, database 108 resides on server computer 104. In another embodiment, database 108 may reside elsewhere within distributed data processing environment 100 provided user identification program 106 has access to database 108.

Server computer 104 includes user identification program 106 for real-time identification of users. Some embodiments of the present invention use real-time contextual data (e.g., user location) as well as real-time generated insights for a user (e.g., user behavior with respect to products or services), to compare with stored social profiles based on real-time dynamic social data (e.g., user activity in social media) and static social data (e.g., user profile data) for purposes of user identification. Other embodiments of the present invention build subsets of social profiles to match contextual, real-time social media data, and static social media data in order to improve user identification. These aspects of the disclosure are discussed subsequently with reference to FIGS. 2-5.

Figure 2:
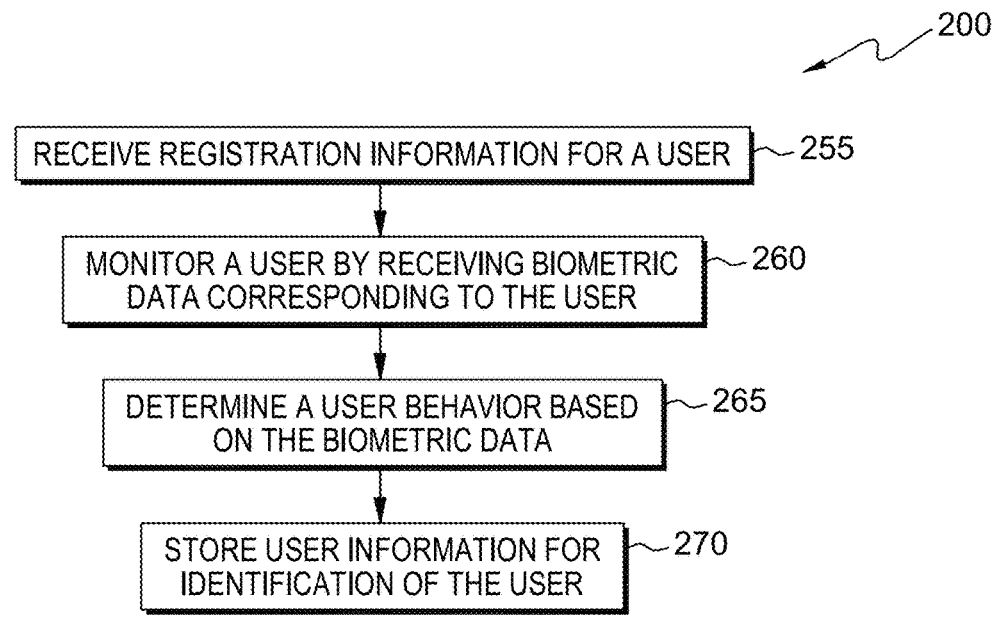
FIG. 2 is a flowchart depicting operational steps of a user identification program, on a server computer within the distributed data processing environment of FIG. 1, for receiving identification for a user and analyzing user behavior captured via site sensors in order to identify the user in the future, in accordance with an embodiment of the present invention.

User identification program 106 is depicted and described in further detail with respect to FIG. 2. Referring to flowchart 200, user identification program 106 receives identification for a user and analyzes user behavior captured via site sensors 116 in order to identify the user in the future.

Processing begins at operation 255, where user identification program 106 receives a registration information for a user. In some embodiments of the present invention, the registration information may be received via a registration process where the user provides biometric data that allows high confidence identification of the user by the system. In some embodiments, biometric data includes images received from a photographic or video camera, data received from a depth sensing camera, data received from temperature sensors, or any other data that may be used to identify the user and the user behavior in a physical location such as a retail store. In some embodiments, the biometric data may be obtained via site sensors 116. In other embodiments, the user may provide biometric data as part of the registration process. In an example embodiment, a department store runs user identification program 106 to provide marketing services for the users. In this exemplary embodiment, a user named Ben registers in the user identification program 106 by providing one or more pictures coupled with personal information (e.g., address, telephone, and other similar information).

Processing continues at operation 260, where user identification program 106 monitors a user by receiving biometric data corresponding to the user. In some embodiments of the present invention, biometric data may be received from site sensors 116 placed at a specific location (e.g., a store or restaurant). In an example embodiment, Ben walks into the department store a week after registering in user identification program 106. Site sensors 116 begin to monitor Ben by obtaining his biometric data.

Processing proceeds at operation 265, where user identification program 106 determines user behavior based on the biometric data for the user. In some embodiments of the present invention, user identification program 106 performs sensor based methods (e.g., cameras, depth sensors, temperature sensors, among others) for identifying the users and detecting interactions between the user and the site location using one or more site sensors 116. In some embodiments, user behavior is determined by factors such as the time spent looking at a specific product, product characteristics (e.g., clearance or sales products) or product categories (e.g., clothes for 3-5 years old babies), time spent at a specific aisle, identification of products for which the user has performed a price check, path taken in the store, among others.

In some embodiments of the present invention, user identification program 106 continuously learns and stores the user behavior. In some embodiments, user information and behaviors are added or modified in the user profile as they are discovered. In some embodiments, user information and behaviors are removed or weighted relatively lower for identification purpose as the user information is found to be no longer relevant. In some embodiments, changes to the user information and behaviors (e.g., adding, modifying, removing, or weighting user information and behaviors) may be determined based using existing methods, such as aging of data, and trends, among other similar factors. In some embodiments, user information and behaviors may be determined by probability over a period of time. For example, if a user looked for clothes for a 3-year old baby 2 years ago, user identification program 106 may identify the user by associating behavior based on clothes for a 5-year old baby.

In some embodiments of the present invention, user identification program 106 associates the user behavior captured at different times. The association can be done using a path tracking method, where the user is tracked from location A to location B. This path tracking method will ensure it is the same user at location A and location B, and therefore the behavior belongs to the same user.

In our exemplary embodiment, Ben looks for products and services inside the department store while user identification program 106 analyzes his behavior in order to identify Ben in a future visit to the store.

Processing continues at operation 270, where user identification program 106 stores the user information for identification of the user. In some embodiments of the present invention, the user information, comprising the high confidence identification and the user behavior, is stored in database 108 for future identification of the user. Continuing our exemplary embodiment, after Ben walks out of the department store, user identification program 106 stops collecting user information for Ben, creates a user profile for Ben, and stores the collected information in the user profile.

Figure 3:
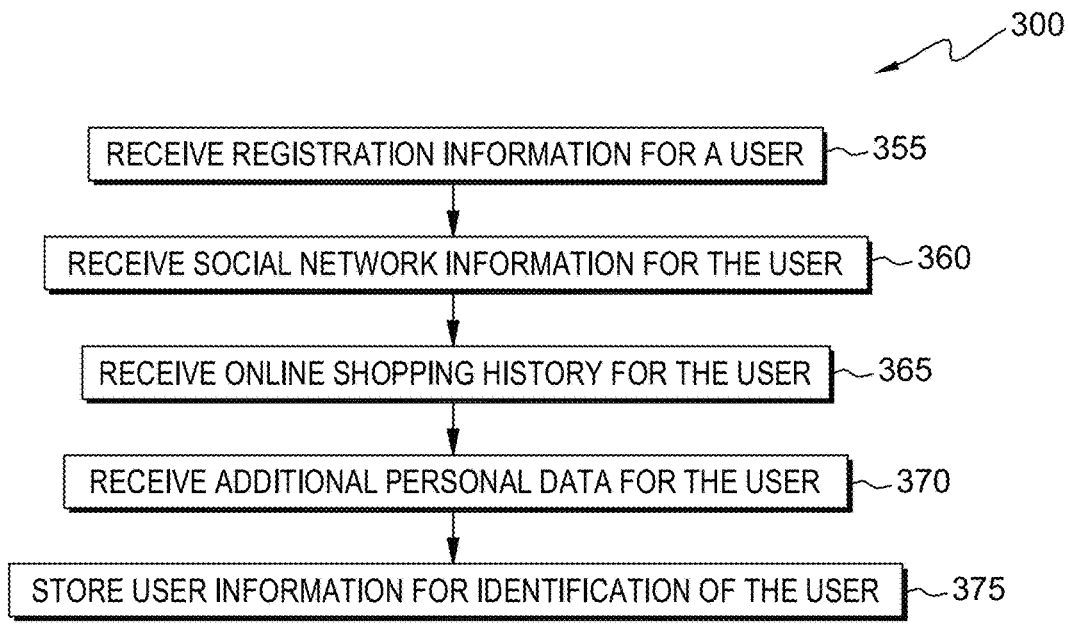
FIG. 3 illustrates operational steps of a user identification program, on a client device within the distributed data processing environment of FIG. 1, for receiving identification for a user, including social media profiles, and analyzing online user behavior in order to identify the user in the future, in accordance with an embodiment of the present invention.

Another aspect of user identification program 106 is depicted and described in further detail with respect to FIG. 3. Referring to flowchart 300, user identification program 106 receives identification for a user, including social media profiles, and analyzes online user behavior in order to identify the user in the future.

Processing begins at operation 355, where user identification program 106 receives registration information for a user. In some embodiments of the present invention, the registration information for the user may be received via a registration process where the user provides biometric data for high confidence identification by the system. In an example embodiment, Ben registers in the user identification program 106 by providing one or more pictures coupled with personal information (e.g., address, telephone, and other similar information).

Processing continues at operation 360, where user identification program 106 receives social network information for the user. In some embodiments of the present invention, the user provides links for his/her social media profiles. In other embodiments, user identification program 106 obtains authorization to access data from the social media profiles provided by the user. In our exemplary embodiment, Ben provides a link to his social media profiles and provides user identification program 106 with the pertinent authorization to access the social media profiles.

Processing proceeds at operation 365, where user identification program 106 receives online shopping history for the user. In some embodiments of the present invention, user identification program 106 traverses the social media profiles of the user to determine products that the user has recently bought, expressed sentiment (e.g., liked or followed products), browsed, discussed, or searched for. In other embodiments, user identification program 106 traverses the social media profiles of the user to determine the shopping preferences of the user (e.g., favorite brands). Continuing our exemplary embodiment, user identification program 106 receives information about the shopping history and preferences for Ben.

Processing proceeds at operation 370, where user identification program 106 receives additional personal data for the user. In some embodiments of the present invention, user identification program 106 further receives additional personal data for the user such as calendar information. Continuing our exemplary embodiment, Ben provides a link to his cloud-based calendar and provides user identification program 106 with the pertinent authorization to access the social media profiles.

Processing continues at operation 375, where user identification program 106 creates a profile for the user and stores the user information for identification. In an exemplary embodiment, user identification program 106 stores the identification and collected information for Ben in database 108.

Figure 4:
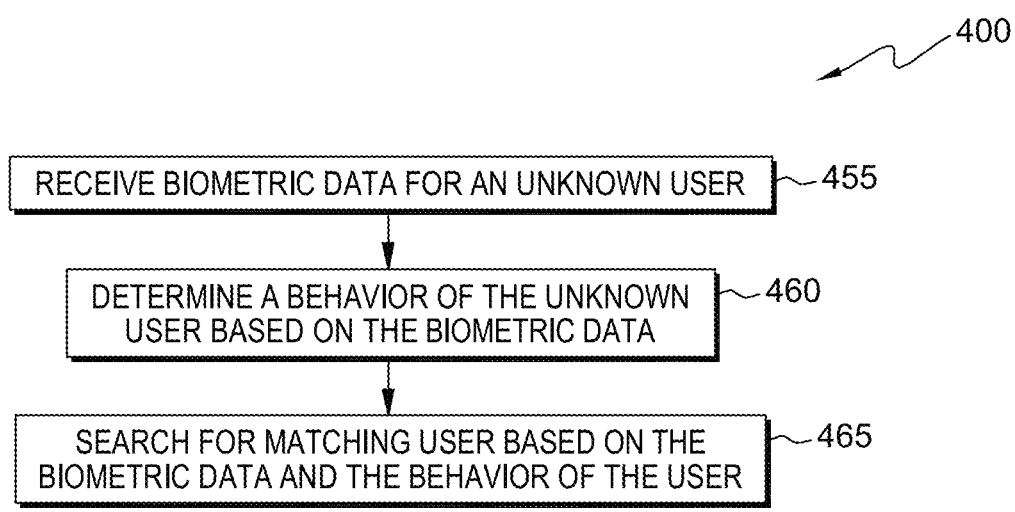
FIG. 4 is a flowchart depicting operational steps of a user identification program, on a server computer within the distributed data processing environment of FIG. 1, for analyzing user behavior based on received biometric data and comparing the biometric data and the user behavior with stored user profiles, in accordance with an embodiment of the present invention.

A further aspect of user identification program 106 is depicted and described in further detail with respect to FIG. 4. Referring to flowchart 400, user identification program 106 receives a low confidence identification for a user. User identification program 106 further receives biometric data from site sensors 116 and identifies user behavior based on the received biometric data. User identification compares the biometric data and the user behavior with stored user profiles in database 108.

Processing begins at operation 455, where user identification program 106 receives a biometric data for an unknown user. In some embodiments of the present invention, user identification program 106 receives a set of images for an unknown user. In this context, unknown user means a user that has not yet been identified either because there is no profile associated with the user or because there is not enough information to identify the user yet. In some embodiments, user identification program 106 captures biometric data for a user from site sensors 116. In an exemplary embodiment, User A walks into a department store where site sensors 116 begin to capture his biometric data while User A is inside the store. In this exemplary embodiment, user identification program 106 cannot determine the identity of User A based on the information available.

Processing proceeds at operation 460, where user identification program 106 determines a behavior of the unknown user based on the biometric data. In some embodiments of the present invention, user behavior is determined by factors such as the time spent looking at a specific product, time spent at a specific aisle, identification of products for which the user has performed a price check, among others. In our exemplary embodiment, User A visits the children toy section and later the sports clothing section.

Processing continues at operation 465, where user identification program 106 searches for a matching user in a database based on the biometric data of the user and the behavior of the user. In some embodiments of the present invention, user identification program 106 searches for a matching user profile in database 108. In some embodiments of the present invention, a subset of the user behavior can be used to calculate the confidence score when matching against a user profile. In other embodiments, the percentages or probability from multiple user behaviors can be combined using in a linear combination or any other suitable formulation. In these embodiments, the formulation and appropriateness of the user behavior can be determined through continuous verification of whether a user was correctly identified or not. In some embodiments, the percentages or probability of a behavior can be measured, projected, and/or determined by other existing methods. In other embodiments, the relationship between each behavior from multiple users (both online and in store behavior) can be determined using existing analytics methods including clustering, simulation, and/or other existing methods.

In our exemplary embodiment, the user profile for Ben states 5 different categories that Ben is interested in as follows: (i) Ben stops by the food court 95% of the time, (ii) Ben visits 2-3 categories each visit, (iii) Ben visits the children toy section 40% of the time, (iv) Ben visits the sports clothing section 70% of the time, and (v) Ben visits both the children toy section and the sport clothing section 80% of the time. In our exemplary embodiment, user identification program 106 identifies the user profile for Ben based on the biometric data and user behavior for User A.

Figure 5:
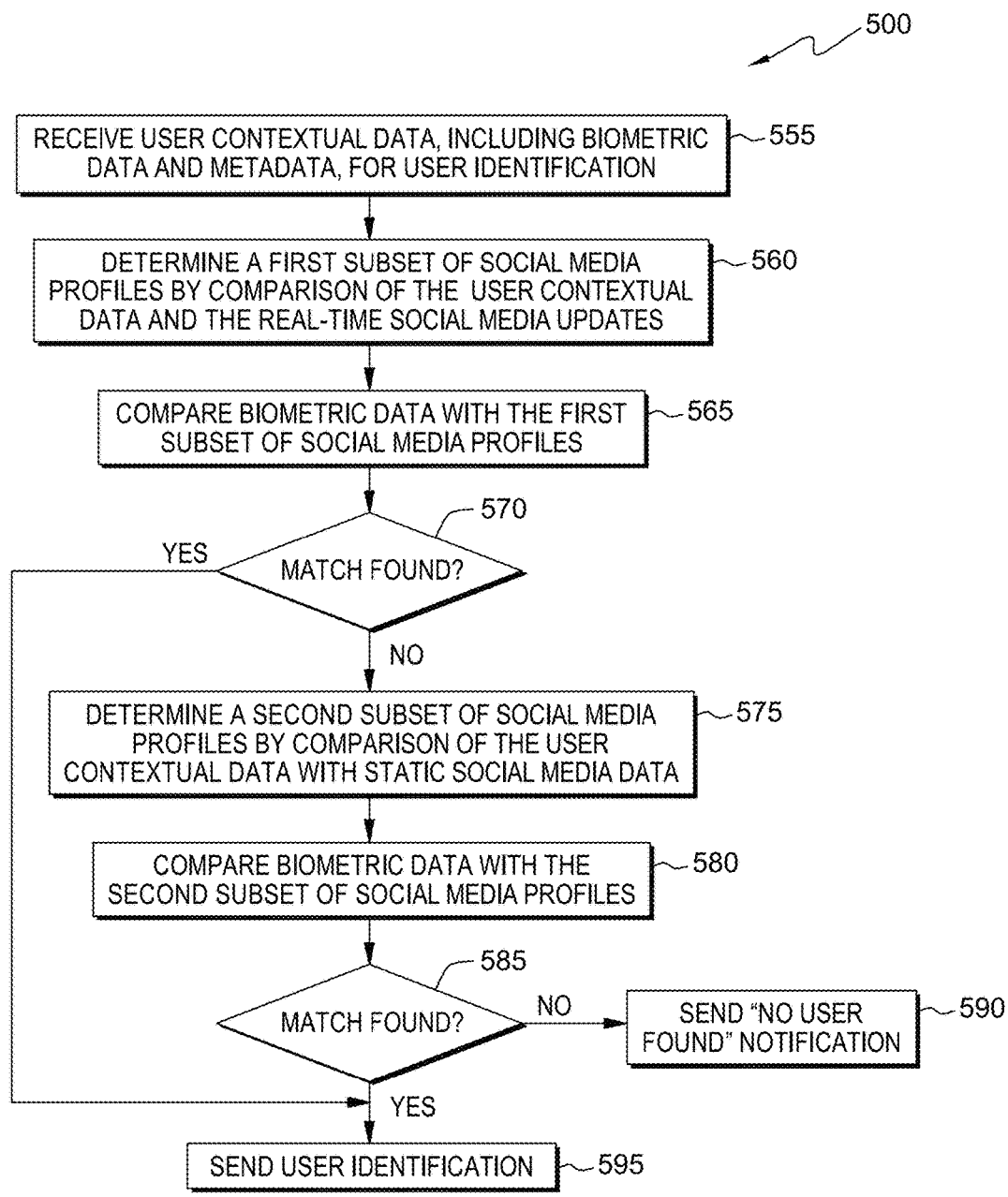
FIG. 5 is a flowchart depicting operational steps of a user identification program, on a server computer within the distributed data processing environment of FIG. 1, for determining one or more subsets of user profiles and comparing contextual data and user insights with the subsets of user profiles, in accordance with an embodiment of the present invention.

An additional aspect of user identification program 106 is depicted and described in further detail with respect to FIG. 5. Referring to flowchart 500, user identification program 106 receives contextual data about a user. User identification program 106 additionally determines one or more subsets of user profiles and compares the contextual data and the user insights with the subsets of user profiles.

Processing begins at operation 555, where user identification program 106 receives user contextual data including biometric data and associated metadata for a user. Examples of user contextual data include GPS position, location name, date, and others. In an exemplary embodiment, User A walks into a department store. User identification program 106 identifies User A as an unknown user. In our exemplary embodiment, User A looks for products and services inside the department store while user identification program 106 analyzes his behavior in order to identify User A.

Processing proceeds at operation 560, where user identification program 106 determines a first subset of social media profiles by comparison of the user contextual data and real-time social media updates. In some embodiments of the present invention, user identification program 106 determines a first subset of social media profiles by comparison of the contextual data with the social media updates, such as geotagging of digital pictures, videos, and postings on social media profiles. Other examples of real-time social updates include mention of locations (e.g., mentioning the name of a store, restaurant, and/or shopping mall), check-in to location in specialized mobile applications, among others. In some embodiments, a list of selection criteria (e.g., geotags, posts about particular products, and others) are assigned a weight based on their relative importance to match users. For example, a list of possible matches for user profiles may be ranked in accordance to each of the selection criteria (e.g., ranking=criteria_1*weight_1+criteria_2*weight_2+ . . . +criteria_n & weight_n). In these and some other embodiments, the user with the highest overall ranking above a predetermined threshold will be selected. In our exemplary embodiment, User A checks-in to the location using a mobile application.

Processing continues at operation 565, where user identification program 106 compares the biometric data with the first subset of social media profiles. In some embodiments of the present invention, user identification program 106 searches for a matching user profile in database 108.

If a match is not found (operation 570, "no" branch), processing continues at operation 575, where user identification program 106 determines a second subset of social media profiles by comparison of the user contextual data with static social media data. In some embodiments of the present invention, user identification program 106 determines a second subset of social media profiles by comparison of the user contextual data with static social media, such as the pages that a user follows in social media profiles. In some embodiments, operation 560 and operation 575 may be combined by determining rankings of profiles based on predetermined criteria and relative weights. In these and some other embodiments, the list of selection criteria may comprise real-time and static social network data. In our exemplary embodiment, User A follows the page of the department store where he is shopping.

Processing proceeds at operation 580, where user identification program 106 compares the biometric data with the second subset of social media profiles. If a match is not found (operation 585, "no" branch), processing continues at operation 590, where user identification program 106 sends a notification that no match was found for the user.

Conversely, if a match is found (operations 570 and 585, "yes" branch), processing continues at operation 595, where user identification program 106 sends the matched identity of the user for the matching social profile. In our exemplary embodiment, user identification program 106 identifies the user profile for Ben based on his contextual data and user identification program 106 sends the user profile.

Server computer 104 includes user identification program 106 for real-time identification of users. Some embodiments of the present invention apply local filtering to a set of input images to improve selection of images for user identification. These aspects of the disclosure are discussed subsequently with reference to FIGS. 6-8.

Figure 6:
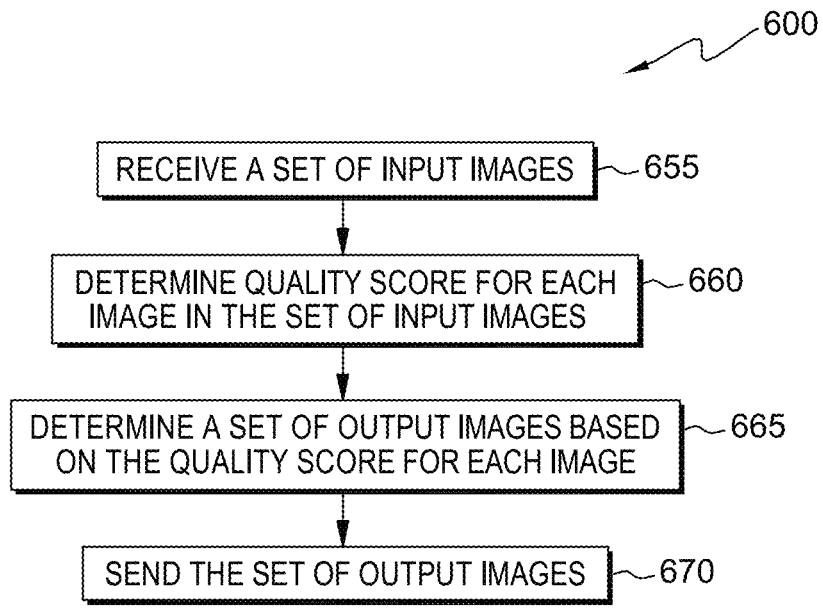
FIG. 6 is a flowchart depicting operational steps of a user identification program, on a server computer within the distributed data processing environment of FIG. 1, for receiving a set of input images and selecting the best images for user identification based on a quality score, in accordance with an embodiment of the present invention.

User identification program 106 is depicted and described in further detail with respect to FIG. 6. Referring to flowchart 600, user identification program 106 receives a set of input images and selects the best images for user identification based on a quality score.

Processing begins at operation 655, where user identification program 106 receives a set of input images. In some embodiments of the present invention, user identification program 106 captures a set of input images for a user from site sensors 116. In our exemplary embodiment, user identification program 106 receives a set of input images (shown in FIG. 8) for Ben. The set of input images includes a plurality of images of varying quality.

Processing continues at operation 660, where user identification program 106 determines a quality score for each image in the set of input images. The attributes affecting the score may include: (a) resolution; (b) luminance and chroma image noise; (c) focus; (d) user identity; (e) angle; and (f) obstruction. Continuing our exemplary embodiment, user identification program 106 analyzes each image as follows: (i) the quality score for image 802 is 50 based on face angle and poor resolution of the image; (ii) the quality score for image 804 is 65 based on high image noise; (iii) the quality score for image 806 is 50 based on the focus of the image; (iv) the quality score for image 808 is 85 based on the face angle of the image; (v) the quality score for image 810 is 0 based on the subject of the image; (vi) the quality score for image 812 is 70 based on an obstruction of the face of the user; (vii) the quality score for image 814 is 50 based on the face angle of the image; and (viii) the quality score for image 816 is 70 based on the face angle of the image.

Processing proceeds at operation 665, where user identification program 106 determines a set of output images based on the quality score for each image in the set of input images. In some embodiments of the present invention, if there are a plurality of images having similar quality scores and characteristics, user identification program 106 may include only a single representative image to the set of output images in order to improve storage and bandwidth utilization. In our exemplary embodiment, user identification program 106 determines a set of user images based on quality score threshold of 70. In this example, user identification program 106 selects images 808, 814, and 816. User identification program 106 excludes image 812 based on an obstruction in the image. Furthermore, user identification program 106 excludes image 808 based on its similarity with image 814.

Processing continues at operation 670, where user identification program 106 sends the set of output images. In some embodiments of the present invention, user identification program 106 sends the set of output images to another computer (not shown) through network 102. In other embodiments, user identification program 106 stores the set of output images in database 108. In our exemplary embodiment, user identification program 106 sends the set of output images to a server of a department store and stores the set of output images in database 108 for future access.

Figure 7:
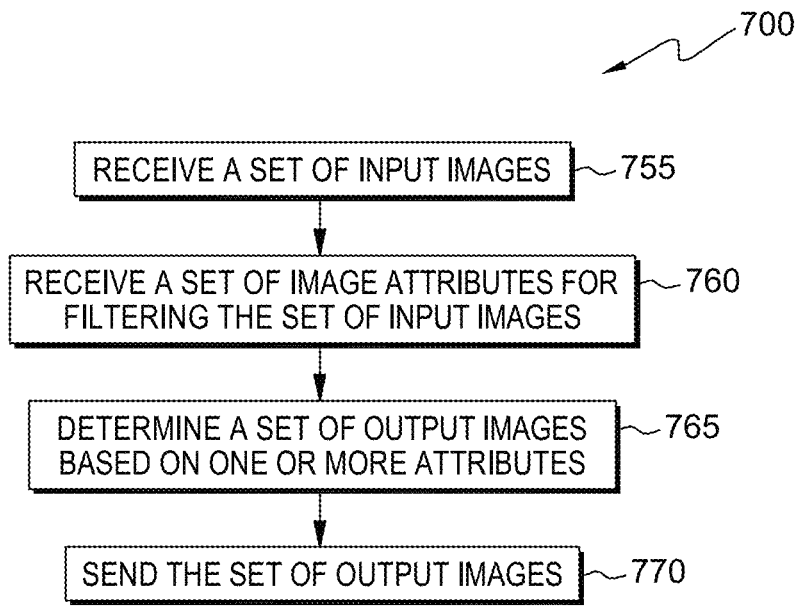
FIG. 7 is a flowchart depicting operational steps of a user identification program, on a server computer within the distributed data processing environment of FIG. 1, for receiving a set of input images and selecting the best images for user identification based on a set of attributes, in accordance with an embodiment of the present invention.
Figure 8:
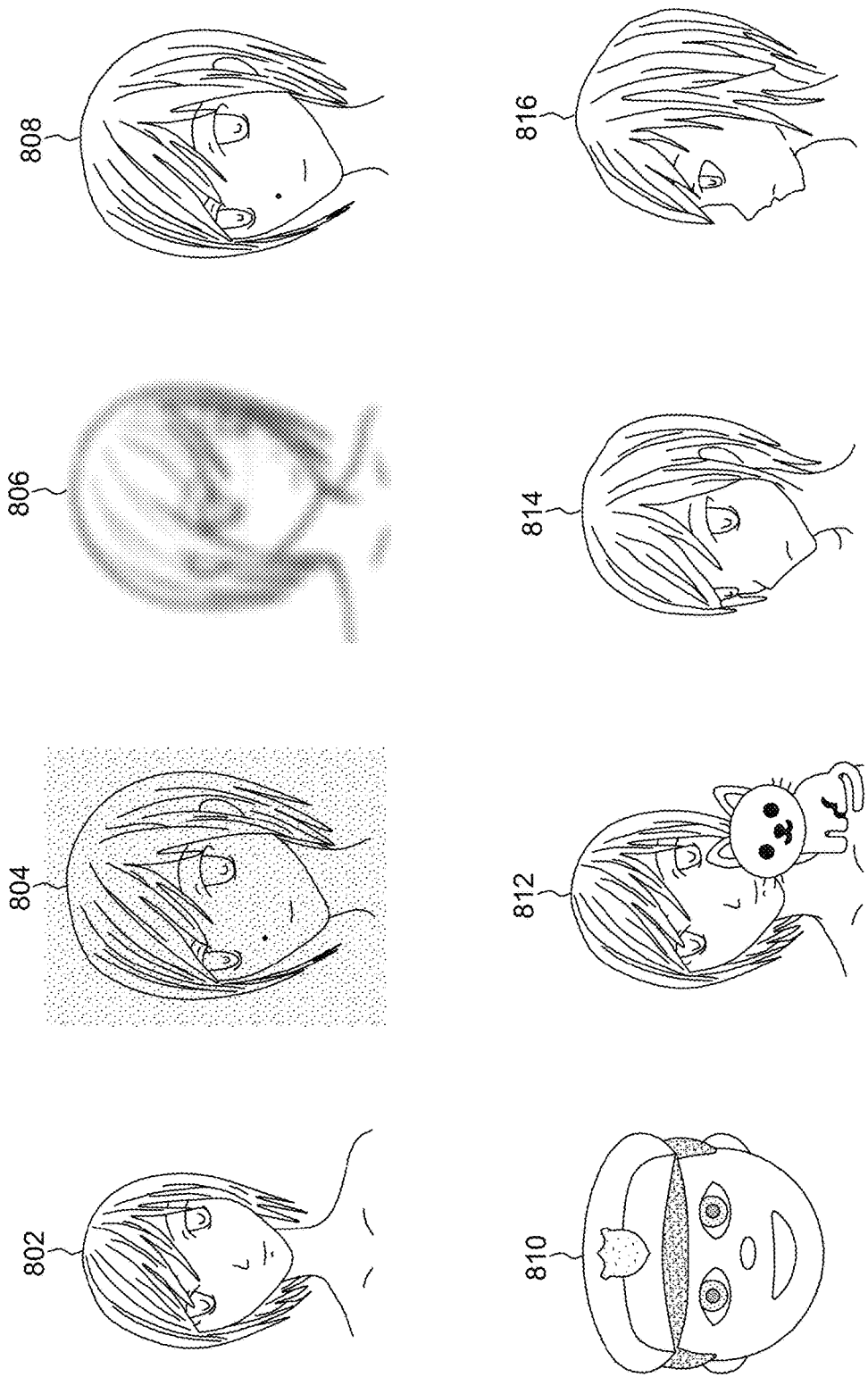
FIG. 8 shows an exemplary set of input images, in accordance with an embodiment of the present invention.

User identification program 106 is depicted and described in further detail with respect to FIG. 7. Referring to flowchart 700, user identification program 106 receives a set of input images and selects the best images for user identification based on a set of attributes.

Processing begins at operation 755, where user identification program 106 receives the set of input images. In our exemplary embodiment, user identification program 106 receives a set of input images (shown in FIG. 8) for Ben. The set of input images includes a plurality of images of varying attributes.

Processing proceeds at operation 760, where user identification program 106 receives a set of image attributes for filtering the set of input images. The set of attributes may include: (a) whether the image includes a body; (b) whether the image includes a face; (c) whether the image includes hair; (d) whether the image includes a face in a predetermined angle (e.g., facing front, facing left, etc.); and (e) whether the image includes a person interacting with an object, among others. The attributes may further include static rules (e.g., face at an angle of 30 degrees or all images with a quality score higher than a predetermined threshold). The attributes may also be determined dynamically by user identification program 106 (e.g., determining a scoring mechanism).

In some embodiments of the present invention, the set of image attributes may be determined by server computer 104 and received by site sensors 116. In these and some other embodiments, site sensors 116 perform the analysis of input images based on the image attributes determined by server computer 104. In an exemplary embodiment, user identification program 106 receives a set of image attributes including face angle (facing at an angle higher than 0) and interaction with objects. In another exemplary embodiment, server computer 104 determine image attributes based on the captured images for a user. For example, images for unknown User A is captured. Server computer 104 identified two known users, Alice and Ann potentially matching this user based on existing image attributes (e.g., long hair, blood hair, 5'10" height). Based on Alice and Ann, server computer 104 determines that Alice wears a necklace 95% of time, while Ann never wears a necklace. In this exemplary embodiment, server computer 104 instructs site sensor 116 to send only images of User A exposes the neck. In a further exemplary embodiment, other similar user attributes can be identified based on information available at the server computer or using computing resources available at the server computer. In these embodiments, the server computer can determine images attributes (e.g., images of users without necklaces) that does not require significant processing resources and in-depth knowledge of the user. In some embodiments, image attributes may also be selected based on the computing resources available at one or more site sensors 116. In these and other embodiments, each site sensor of site sensors 116 may perform different types of pattern recognition. For example, a first site sensor may be configured to recognize body parts based on relative position from the head. In this example, a second site sensor may recognize the shape of hands or feet in relation to a body and a third site sensor may recognize clothing or clothing accessories. In other embodiments, server computer 104 dynamically communicates the image attributes to site sensors 116.

Processing continues at operation 765, where user identification program 106 determines a set of output images by analyzing which images in the set of input images matches one or more attributes in the set of image attributes. Continuing our exemplary embodiment, user identification program 106 analyzes each image and determines a set of output images as follows: (i) image 808 is selected based on a face angle of 15 degrees; (ii) image 812 is selected based on additional object in the image; (iii) image 714 is selected based on face angle of 45 degrees; and (iv) image 816 is selected based on face angle of 90 degrees.

Processing continues at operation 770, where user identification program 106 sends the set of output images. In some embodiments of the present invention, user identification program 106 sends the set of output images to another computer (not shown) through network 102. In other embodiments, user identification program 106 stores the set of output images in database 108. In our exemplary embodiment, user identification program 106 sends the set of output images to a server of a department store and stores the set of output images in database 108 for future access.

Some embodiments of the present invention match multiple sub-optimal images of the user to multiple photos in a social media profile or improve confidence score of identifying an individual by using additional sub-optimal images. These aspects of the disclosure are discussed subsequently with reference to FIGS. 9-12.

Figure 9:
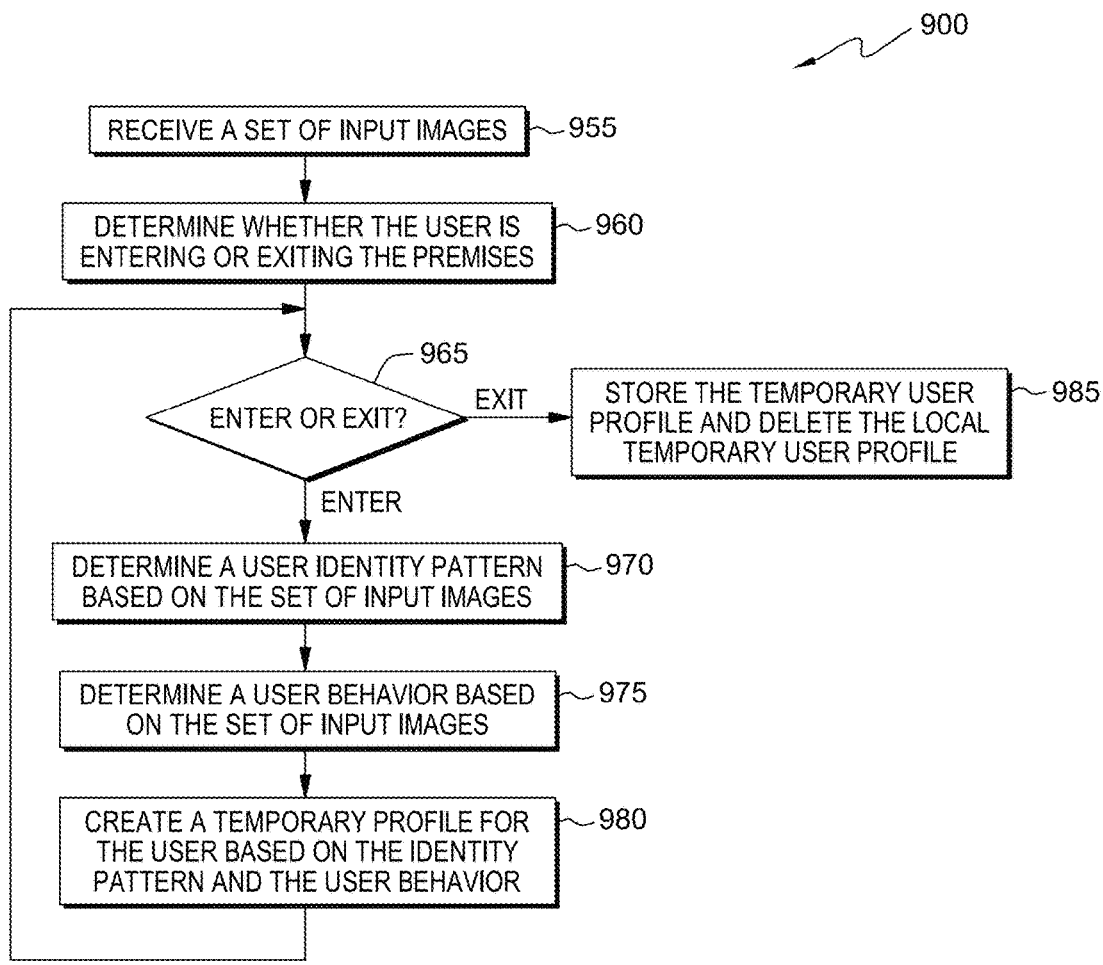
FIG. 9 is a flowchart depicting operational steps of a user identification program, on a server computer within the distributed data processing environment of FIG. 1, for creating and managing temporary user profiles for users in a specific location, in accordance with an embodiment of the present invention.

User identification program 106 is depicted and described in further detail with respect to FIG. 9. Referring to flowchart 900, user identification program 106 creates and manages temporary user profiles for users in a specific location (e.g., a store or a restaurant).

Processing begins at operation 955, where user identification program 106 receives a set of input images. In some embodiments of the present invention, user identification program 106 captures a set of input images for a user from site sensors 116. In an exemplary embodiment, User A enters a department store and user identification program 106 receives a set of input images (shown in FIG. 12) corresponding to User A.

Processing continues at operation 960, where user identification program 106 determines whether the user is entering or exiting the premises. If the user is entering the premises (operation 965, "enter" branch"), processing proceeds at operation 970, where user identification program 106 determines an identity pattern for a user based on the set of input images. Examples of identity patterns include: (a) body shape; (b) clothing color; (c) clothing patterns; (d) physical appearance; (e) gait; and (f) accessories (e.g., necklace, watch, and similar accessories), among other identity patterns. In our exemplary embodiment, User A enters the department store and user identification program 106 identifies a pinstriped shirt (see FIG. 12, profile images 1202, 1204, 1206, 1208, and 1210).

In some embodiments of the present invention, the identity patterns are unique for each user currently within the premises (i.e., users that have entered the premises but have not yet exited). In these embodiments, user identification program 106 determines a set of identify patterns for the user when a user enters the premises. These identity patterns are compared with identity patterns of other users within the premises, such that unique identity patterns can be determined. For example, User X entered the premises with a red t-shirt. User identification program 106 determined that the red t-shirt is a unique identity pattern for User X because there are no other users with red t-shirts currently in the premises. Later, User Y enters the premises with a red t-shirt. In response, user identification program 106 determines that User X and User Y have an overlapped identity pattern (i.e., the identity pattern of red t-shirt) and re-evaluates the identity patterns for User X and User Y, such that the chosen identity patterns allow unique identification of User X and User Y within all the users within the premises. For example, if User X has black hair and User Y has blonde hair, user identification program 106 may determine an identity pattern of black hair with red t-shirt for User X and an identity pattern of blonde hair with red t-shirt for User Y. In some embodiments, users are advised of the identity activities performed before entering the location to minimize privacy concerns. In other embodiments, users consent to the identity activities before entering the location, for example, as part of a registration process.

In some embodiments of the present invention, the identity patterns for a user are selected based on the usability of the identity pattern. For example, a unique shoe might not be usable all the time because the shoe might be blocked by obstacle between the camera and the user. Instead, patterns from the upper body might be preferred. In an alternative embodiment, multiple identity patterns might be used for a user, while a subset of the pattern is required for uniquely identifying a user. Continuing the example above, User X might have shoes in orange color, which is unique among all users in the store. In this example, the identity pattern for User X could have three components: orange shoe, black hair, and red t-shirt, where User X can be identified as long as one of the components of the identity pattern matches. In other embodiments, user identification program 106 might select an identity pattern to use based on needs, efficiency, or any other criteria. For example, if the upper body for a user is blocked, user identification program 106 can use lower body components of the identity pattern for identification of the user (e.g., shoes in orange color). In the case of a full body image, user identification program 106 can use the component which is easier to process (e.g., shoes in orange color) to identify the user instead of comparing "black hair and red t-shirt," which involves multiple components or more complicated pattern matching.

Processing proceeds at operation 975, where user identification program 106 determines an unknown user behavior based on the set of input images. Examples of user behavior include: (a) interaction with objects; and (b) time at specific locations. Continuing our exemplary embodiment, user identification program 106 tracks the user behavior of User A throughout the store in order to identify his user profile in database 108. User A spends twenty minutes in the electronics department looking for flat-screen television sets.

Processing continues at operation 980, where user identification program 106 creates a temporary profile for the user based on the identity pattern and the user behavior. Continuing our exemplary embodiment, user identification program 106 user identification program 106 creates a temporary profile including the images and user behavior for User A.

If the user is exiting the premises (operation 960, "exit" branch"), processing proceeds at operation 985, where user identification program 106 stores the temporary user profile in database 108 and deletes the local temporary profile. In our exemplary embodiment, User A exits the store and user identification program 106 stores the temporary user profile for User A in database 108 and deletes the local temporary file.

Figure 10:
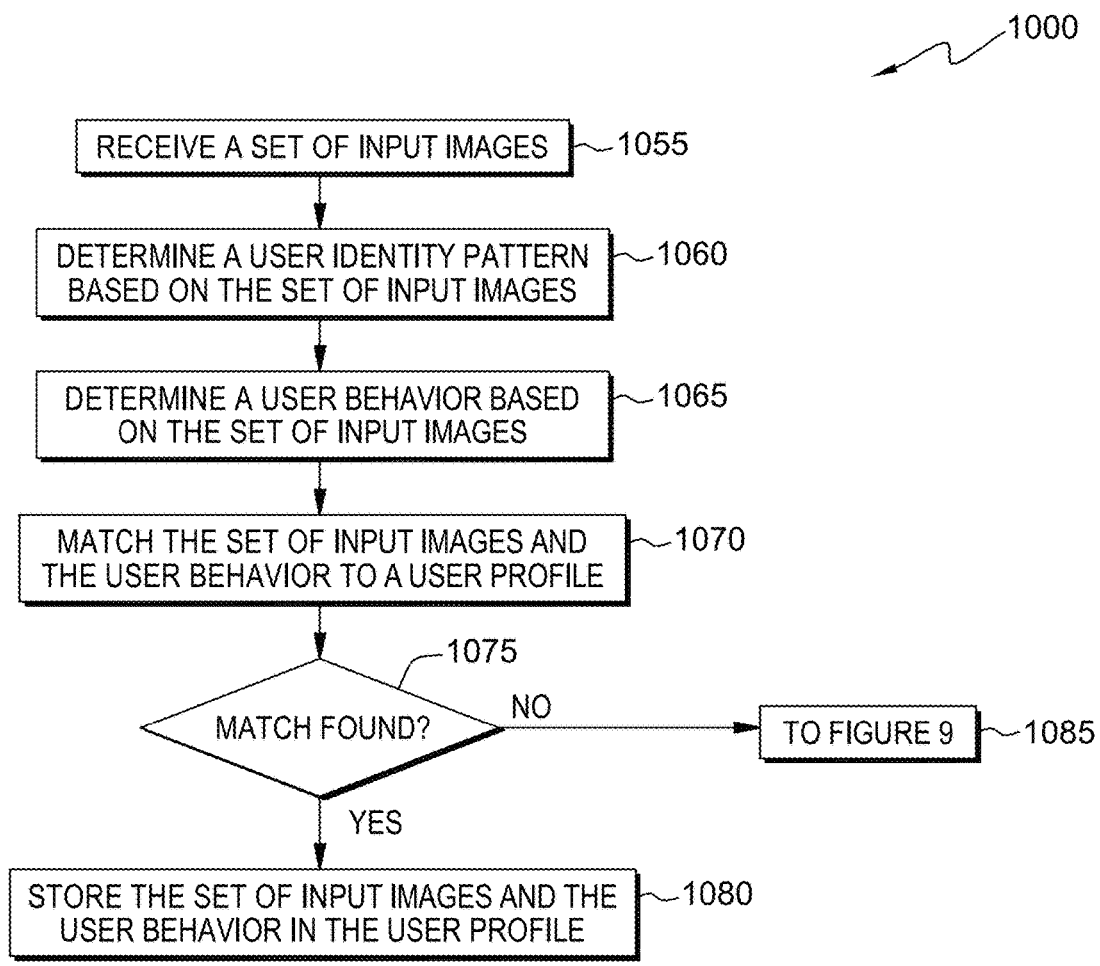
FIG. 10 is a flowchart depicting operational steps of a user identification program, on a server computer within the distributed data processing environment of FIG. 1, for matching temporary user profiles for users in a specific location with a stored user profile, in accordance with an embodiment of the present invention.

User identification program 106 is depicted and described in further detail with respect to FIG. 10. Referring to flowchart 1000, user identification program 106 matches temporary user profiles for users in a specific location (e.g., a store or a restaurant) with a stored user profile.

Processing begins at operation 1055, where user identification program 106 receives a set of input images. In some embodiments of the present invention, user identification program 106 captures a set of input images for a user from site sensors 116. In an exemplary embodiment, User A enters a department store and user identification program 106 receives a set of input images (shown in FIG. 12) for Ben.

Processing continues at operation 1060, where user identification program 106 determines an identity pattern for a user based on the set of input images. Examples of identity patterns include: (a) body shape; (b) clothing color; (c) clothing patterns; (d) physical appearance; (e) gait; and (f) accessories (e.g., necklace, watch, and similar accessories), among other identity patterns. In our exemplary embodiment, User A enters the department store and user identification program 106 identifies a pinstriped shirt (see FIG. 12, profile images 1202, 1204, 1206, 1208, and 1210).

Processing proceeds at operation 1065, where user identification program 106 determines a user behavior based on the set of input images. Examples of user behavior include: (a) interaction with objects; and (b) time at specific locations. Continuing our exemplary embodiment, user identification program 106 tracks the user behavior of User A throughout the store in order to identify his user profile in database 108. User A spends twenty minutes in the electronics department looking for flat-screen television sets.

Processing continues at operation 1070, where user identification program 106 matches the set of input images and the user behavior to a user profile. In our exemplary embodiment, user identification program 106 matches each profile image 1202, 1204, 1206, 1208, and 1210 in the set of input images with the profile images 1212, 1214, and 1216 associated with a user profile for Ben. Profile images 1212, 1214, and 1216 associated with the user profile may have been chosen in accordance to one or more embodiments of the present invention based on the quality score and/or the attributes of the image. The results of the image comparisons are as follows: (i) profile image 1212 matches the profile images 1202, 1204, 1206, 1208, and 1210 with confidence of 0, 0.6, 0.4, 0.2, and 0.7, respectively; (ii) profile image 1214 matches the profile images 1202, 1204, 1206, 1208, and 1210 with confidence of 0, 0.2, 0.5, 0.3, and 0.6, respectively; and (iii) profile image 1212 matches the profile images 1202, 1204, 1206, 1208, and 1210 with confidence of 0, 0.3, 0.4, 0.2, and 0.6, respectively. Based on these results, user identification program 106 identifies Ben as User A. Ben also matches User A's behavior with high confidence (0.8) based on a user profile with an average fifteen minutes spent in the electronics department per visit. Thus, user identification program 106 identifies matches the temporary user profile of User A to the user profile of Ben.

If a match is not found (operation 1075, "no" branch), execution continues at operation 1085, where user identification program 106 may generate a temporary user profile in accordance with the embodiment described in FIG. 9. If a match is found (operation 1075, "yes" branch), processing proceeds at operation 1080, where user identification program 106 stores the set of input images and the user behavior under the user profile. In our exemplary embodiment, the set of input images and the user behavior for User A is stored in the user profile for User A in database 108.

Figure 11:
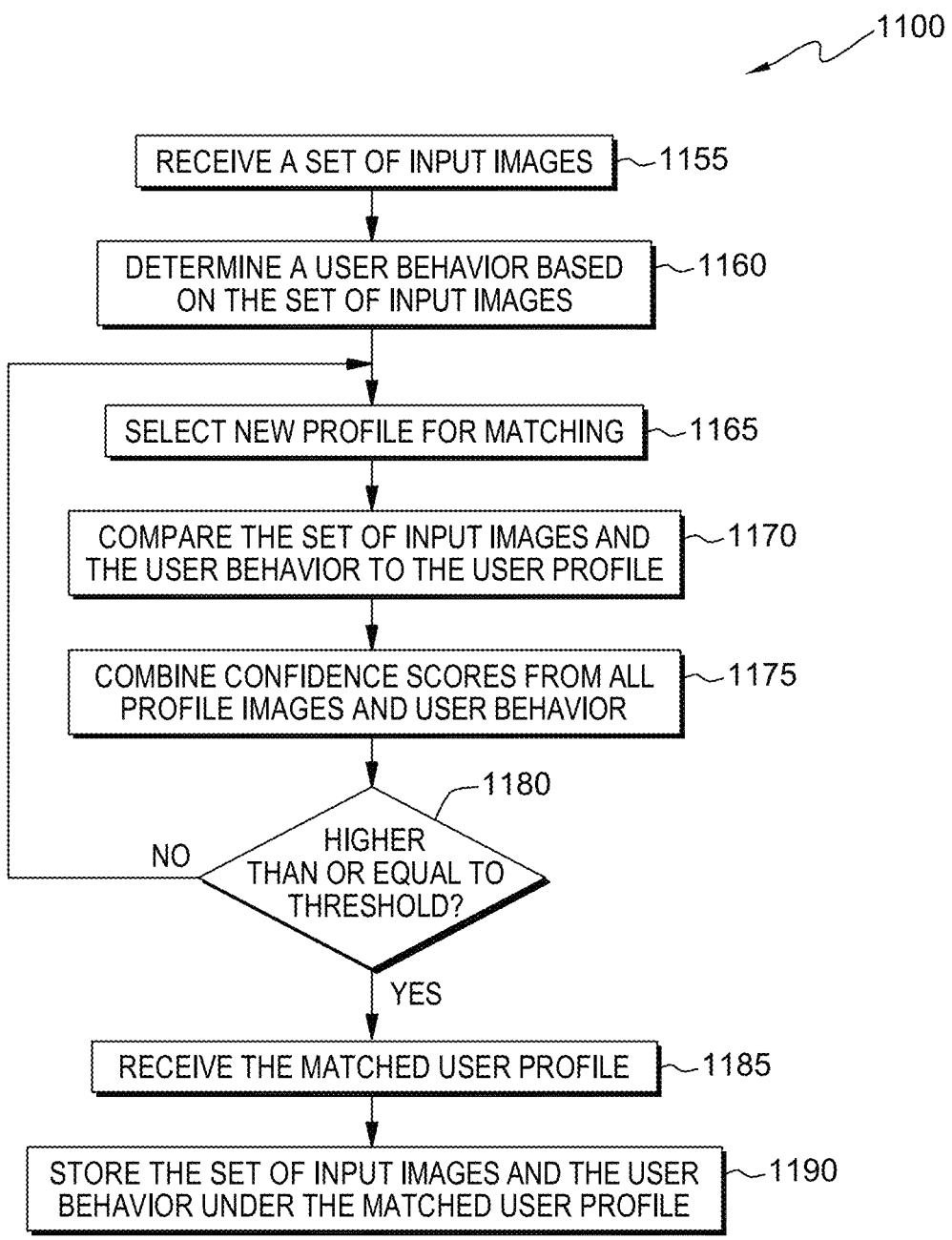
FIG. 11 is a flowchart depicting operational steps of a user identification program, on a server computer within the distributed data processing environment of FIG. 1, for matching temporary user profiles for users in a specific location with a stored user profile, in accordance with an embodiment of the present invention.
Figure 12:
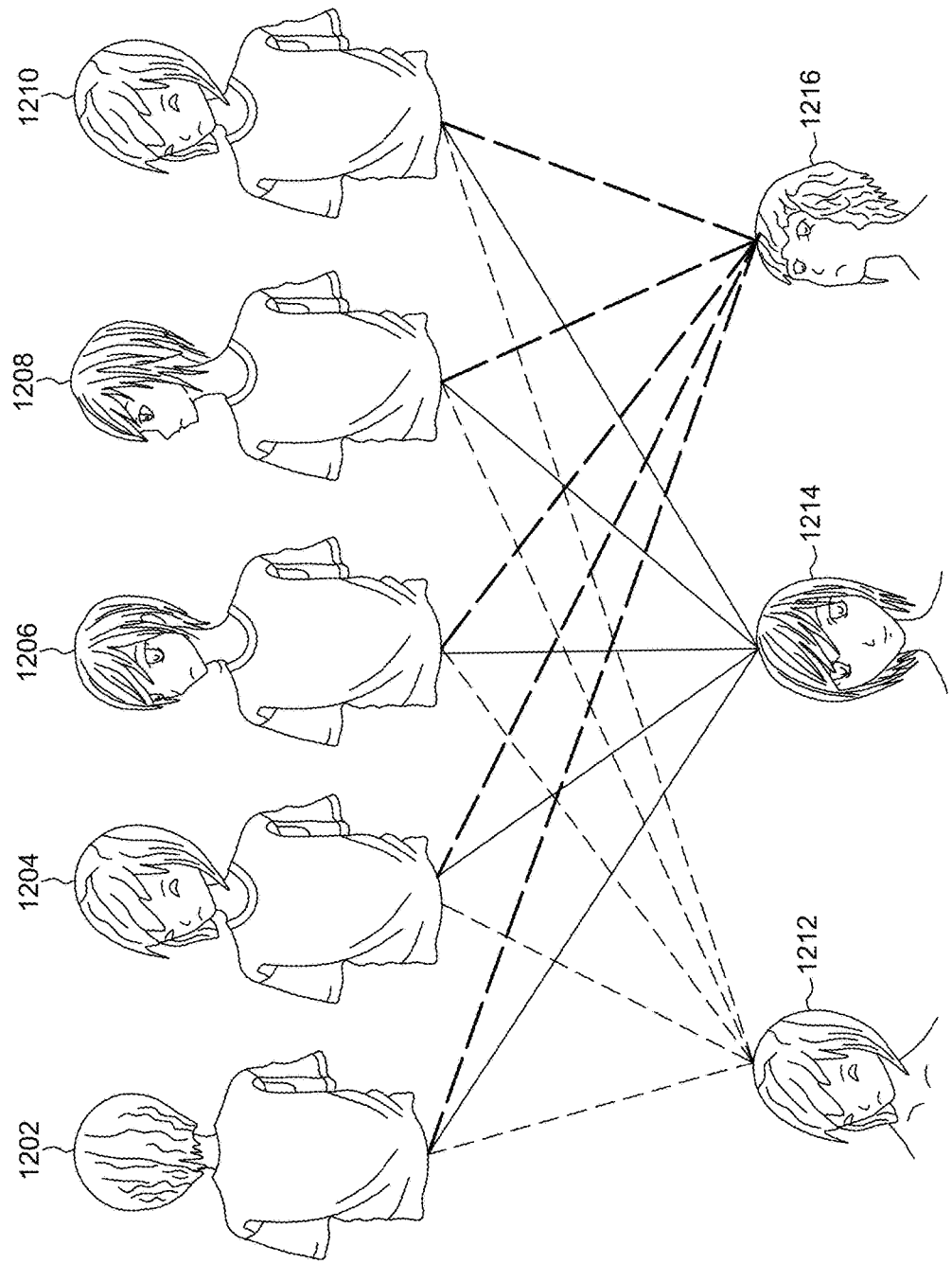
FIG. 12 shows an exemplary comparison between a set of input images and a set of profile images, in accordance with an embodiment of the present invention.

User identification program 106 is depicted and described in further detail with respect to FIG. 11. Referring to flowchart 1100, user identification program 106 matches a temporary user profile for users in a specific location (e.g., a store or a restaurant) with a stored user profile.

Processing begins at operation 1155, where user identification program 106 receives a set of input images. In some embodiments of the present invention, user identification program 106 captures a set of input images for a user from site sensors 116. In an exemplary embodiment, User A enters a department store and user identification program 106 receives a set of input images (shown in FIG. 12) for User A.

Processing continues at operation 1160, where user identification program 106 determines a user behavior based on the set of input images. Examples of user behavior include: (a) interaction with objects; and (b) time at specific locations. Continuing our exemplary embodiment, user identification program 106 tracks the user behavior of User A throughout the store in order to identify his user profile in database 108. User A spends twenty minutes in the electronics department looking for flat-screen television sets.

Processing continues at operation 1165, where user identification program 106 selects a new user profile for matching. In some embodiments of the present invention, selection of the user profile for matching may be based on one or more embodiments described in this disclosure (e.g., FIG. 2-5).

Processing continues at operation 1170, where user identification program 106 compares the set of input images and the user behavior to the user profile. In our exemplary embodiment, user identification program 106 matches each profile image 1202, 1204, 1206, 1208, and 1210 in the set of input images with the profile images 1212, 1214, and 1216 stored in a user profile for User A. Profile images 1212, 1214, and 1216 stored in the user profile may have been chosen in accordance to one or more embodiments of the present invention based on the quality score and/or the attributes of the image. The results of the image comparisons are as follows: (i) profile image 1212 matches the profile images 1202, 1204, 1206, 1208, and 1210 with confidence of 0, 0.6, 0.4, 0.2, and 0.7, respectively; (ii) profile image 1214 matches the profile images 1202, 1204, 1206, 1208, and 1210 with confidence of 0, 0.2, 0.5, 0.3, and 0.6, respectively; and (iii) profile image 1212 matches the profile images 1202, 1204, 1206, 1208, and 1210 with confidence of 0, 0.3, 0.4, 0.2, and 0.6, respectively. User A also matches the user behavior with high confidence (0.8) based on a user profile with an average fifteen minutes spent in the electronics department per visit.

Processing continues at operation 1175, where user identification program 106 combines multiple confidence scores from all profile images and user behavior. In some embodiments of the present invention, the confidence for each profile photo can be combined by any suitable function (e.g., maximum confidence for each image weighted average of the confidence for each image, weighted average of highest score matching for each profile image, or dynamic weight that is learned over time). In our exemplary embodiment, user identification program 106 combines the confidence scores for the images using a max function. In this case, the maximum confidence is 0.7. In the exemplary embodiment, user identification program 106 combines the confidence score for the user behavior (0.8) and the confidence scores for the image (0.7) by a weighted average function. In this case, the combined confidence score is 0.7.

In some embodiments of the present invention, combining the confidence scores for each profile photo and behavior can improve over time and a profile photo can be added or removed based on its effectiveness of providing accurate matching based on machine learning. For example, a 90% match with frontal facial image typically means a very good match of captured image and profile photo for User A. If images with 45 degrees of the frontal face are also captured for User A, these images can be compared with all the profile images belonging to the user and profile images belonging to different users. If these captured images match the profile image of User A with 95% confidence while the highest confidence for profile images for other users is 60%, then these captured images will be assigned to User A with a very high weight. In another example, if the captured image for the user has a very low confidence score when compared with profile images for other users, then this captured image can be added as a profile image for the user because no one else matches it. In some embodiments, profile images that are added to a user profile will have a high weight only if the confidence score is high with respect to the matching user. In some embodiments, if the confidence score of matching is low (e.g., less than 60% confident), the profile image will not affect the combined confidence score. In another example, a profile image can be compared with profile images of other users. In some embodiments, the weight for a profile image may be decreased, removed, or remove when weight is below a threshold, if the profile image provides relatively high confidence score of matching other users (e.g., 70% or more).

Processing continues at operation 1180, where user identification determines the combined confidence score is higher than or equal to a threshold. In some embodiments of the present invention, the threshold may be a predetermined threshold or an adjustable threshold based on machine learning patterns. If the combined threshold is higher than or equal to the threshold (operation 1180, "yes" branch), processing continues at operation 1185, where user identification program 106 receives the matched user profile. In some embodiments, user identification program 106 receives a user profile ID for the matched user profile. In our exemplary embodiment, the predetermined threshold is 0.7 and the combined confidence score is equal to the predetermined threshold (0.7). Therefore, user identification program 106 receives the user profile for Ben.

Processing proceeds at operation 1190, where user identification program 106 stores the set of input images and the user behavior under the matched user profile. In our exemplary embodiment, the set of input images and the user behavior for User A is stored in the user profile for Ben in database 108.

If the combined threshold is below the threshold (operation 1180, "no" branch), processing continues at operation 1165, where user identification program 106 selects a new user profile for matching.

Some embodiments of the present invention provide a passively managed loyalty program based on user attributes and behaviors. Some embodiments of the present invention may also provide additional functionality to traditional loyalty programs and/or actively managed loyalty programs. These aspects of the disclosure are discussed subsequently with reference to FIGS. 13-24.

Figure 13:
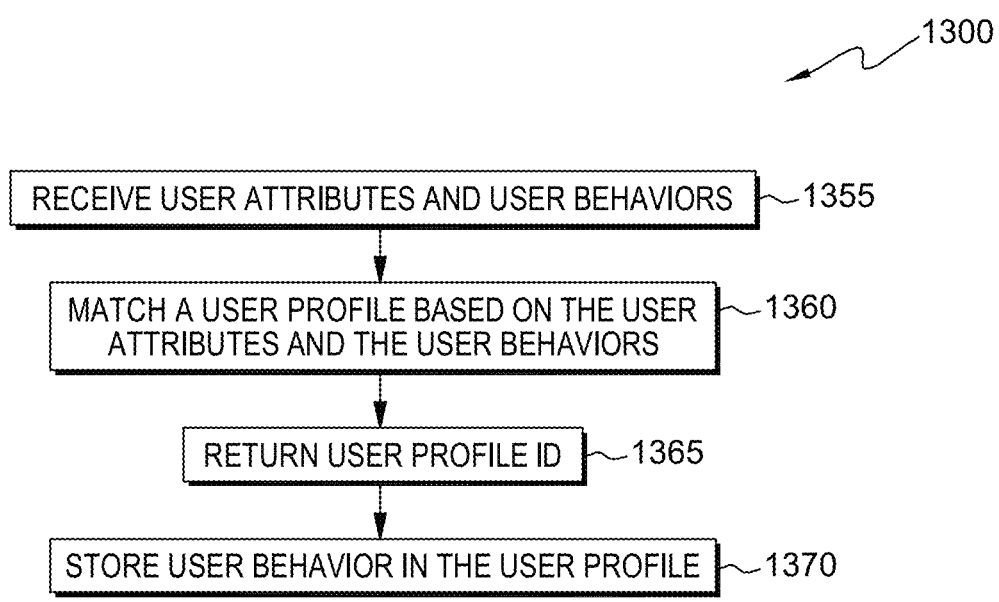
FIG. 13 is a flowchart depicting operational steps of a user identification program, on a server computer within the distributed data processing environment of FIG. 1, for storage of customer characteristics and behaviors for a passively managed customer loyalty program through the use of social media profiles, in accordance with an embodiment of the present invention.

User identification program 106 is depicted and described in further detail with respect to FIG. 13. Referring to flowchart 1300, user identification program 106 provides a passively managed loyalty program for users in a specific location (e.g., a store or a restaurant) based on a database of user profiles (e.g., social network profiles, profiles within the brick and mortar retail store database, profiles from the online retailer database, profiles from a distributed and/or shared ledger, among others).

Processing begins at operation 1355, where user identification program 106 receives user attributes and user behaviors. In some embodiments of the present invention, user identification program 106 captures a set of input images for a user from site sensors 116 and determines user attributes and user behaviors from the set of input images. In some embodiments of the present invention, receiving the user attributes (e.g., identity patterns) and the user behaviors for a user may be based on one or more embodiments described in this disclosure.

Processing continues at operation 1360, where user identification program 106 matches a user profile based on the user attributes and the user behaviors. In some embodiments of the present invention, user identification program 106 queries one or more user profiles successively to find a matching user. In some embodiments, querying for a user profile may be based on one or more embodiments described in this disclosure.

Processing proceeds at operation 1365, where user identification program 106 returns a user profile ID. In some embodiments of the present invention, the user profile ID is a numeric or alphanumeric unique identifier (UID) guaranteed to be unique for the matched user profile within a specific client (e.g., a database for a specific retail store). In other embodiments, the user profile ID is a numeric or alphanumeric universally unique identifier (UUID) guaranteed to be unique for the matched user profile for all stored user profiles.

Processing continues at operation 1370, where user identification program 106 stores the user attributes and user behaviors in the user profile. In some embodiments of the present invention, user identification program 106 uses the user profile ID to access and store the user attributes and user behaviors in the matched user profile.

Figure 14:
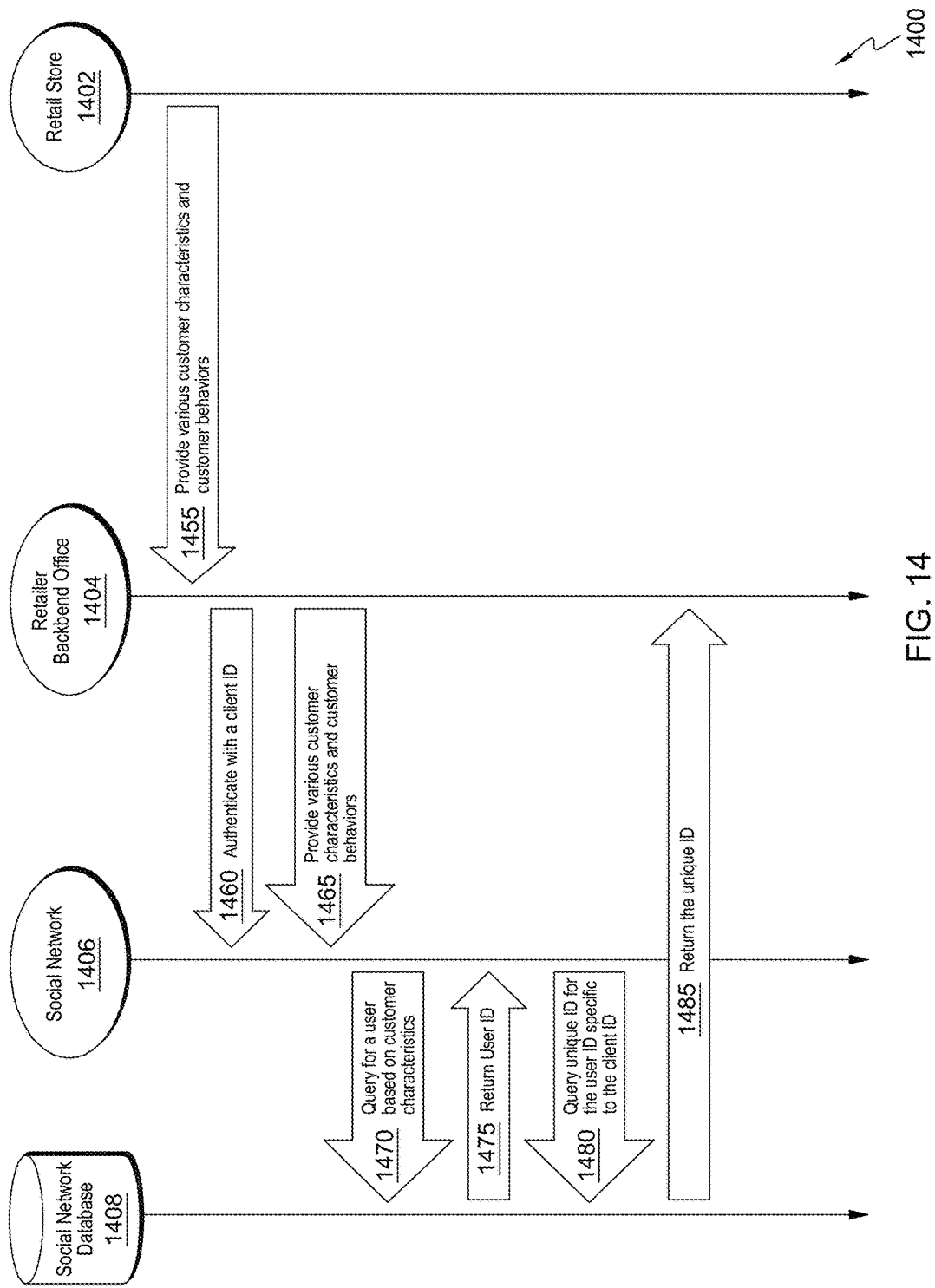
FIG. 14 is a functional block diagram and flowchart illustrating a distributed data processing environment for a passively managed customer loyalty program through the use of social media profiles, in accordance with an embodiment of the present invention.

FIG. 14 shows an embodiment of a passively managed loyalty program and a social network managed loyalty program for users in a specific location (e.g., a store or a restaurant) based on social network profiles. Referring to diagram 1400, processing begins at operation 1455, where retail store 1402 provides customer characteristics (i.e., user attributes, images of the customer, etc.) and customer behaviors (i.e., user behaviors) for processing by retailer backend office 1404. In some embodiments of the present invention, one or more site sensors 116 at retail store 1402 capture a set of input images and determine user attributes and user behaviors for one or more users. In some embodiments of the present invention, receiving the user attributes (e.g., identity patterns) and the user behaviors for a user may be based on one or more embodiments described in this disclosure.

Processing continues at operation 1460, where retailer backend office 1404 authenticates to social network 1406 using a client ID. In some embodiments of the present invention, a second retailer backend office authenticates to social network 1406 using a second client ID. In some embodiments, the retailer backend office 1404 authenticates to social network 1406 with a client ID via an application programming interface (API). In some embodiments, social network 1406 includes virtual multi-tenant profiles corresponding to different clients (e.g., retail store 1402) each virtual multi-tenant profile providing a separate client configuration and data access configuration. These virtual multi-tenant profiles may map to physical storage located on premise, in the cloud, or as part of social network storage (e.g., social network database 1408). Data stored in this way can be provided with different access control mechanisms, such as crowd-based anonymization, and other mechanisms.

Figure 18:
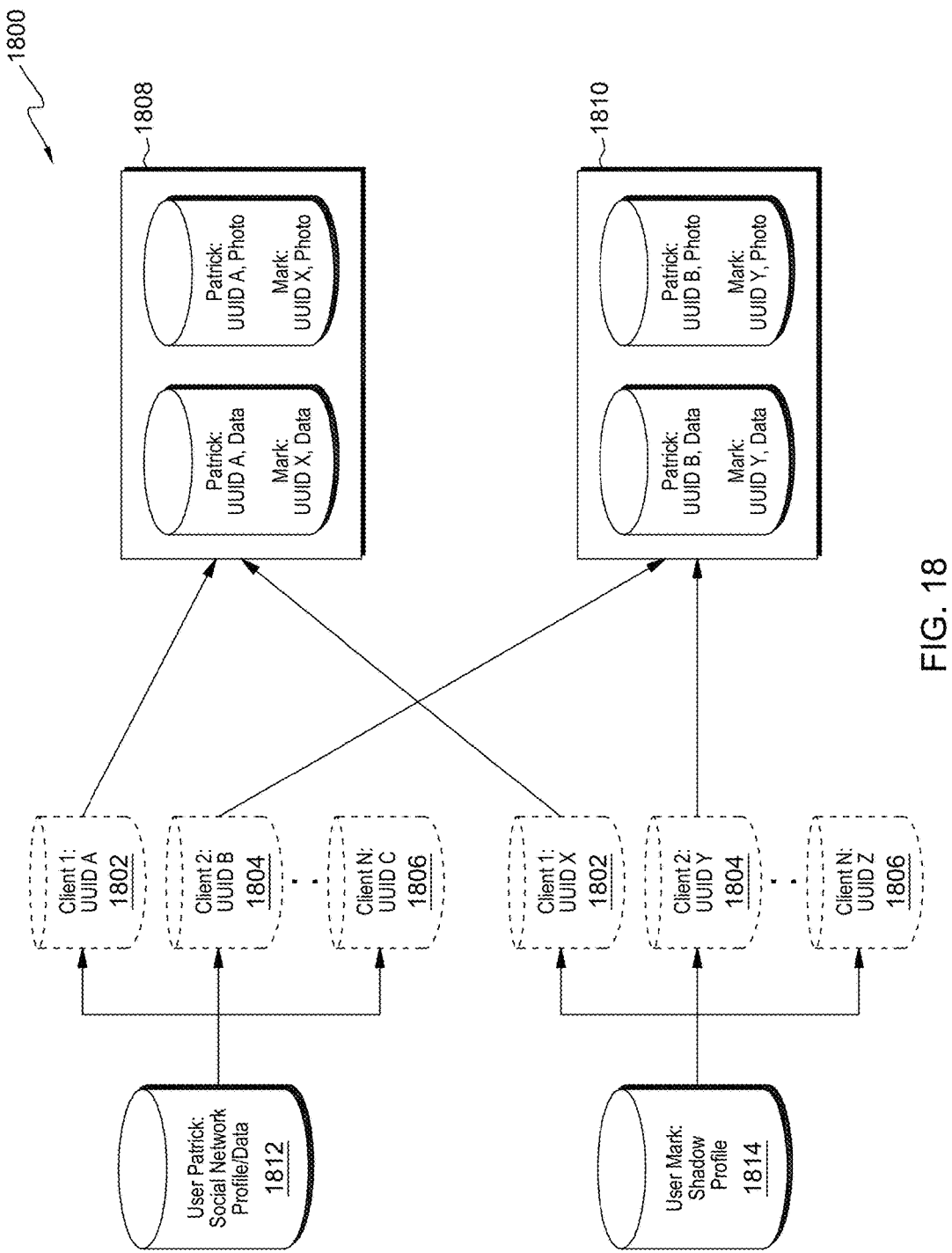
FIG. 18 depicts a block diagram of a multi-tenant database storage for a passively managed customer loyalty program, in accordance with an embodiment of the present invention.

In an exemplary embodiment shown in FIG. 18, diagram 1800, social network database 1408 may include virtual multi-tenant profiles 1802, 1804, and 1806 grouped and isolated from each other in 1808 and 1810. Virtual multi-tenant profiles 1802, 1804, and 1806 may include user 1812 named Patrick and user 1814 named Mark. In this exemplary embodiment, user 1812 represents a social network profile while user 1814 represents a shadow (i.e., temporary) profile.

Processing proceeds at operation 1465, where retailer backend office 1404 provides the customer characteristics (i.e., user attributes) and customer behaviors (i.e., user behaviors) for processing by social network 1406. In some embodiments of the present invention, the retailer backend office 1404 sends the customer characteristics and customer behaviors to social network 1406 with a client ID via an application programming interface (API). In some embodiments, retailer backend office 1404 sends the customer characteristics and customer behaviors to social network 1406 to determine whether the there is a social network profile associated to the user.

Processing continues at operation 1470, where social network 1406 queries social network database 1408 to match a user based on the customer characteristics (i.e., user attributes) and the customer behaviors (i.e., user behaviors). In some embodiments of the present invention, social network 1406 performs operation 1470 at the request of the retailer backend office 1404 by providing its client ID via the application programming interface (API). In some embodiments, social network database 1408 resides on the same computer system as social network 1406. In some embodiments, social network database 1408 includes social network profiles for users. Social network profiles for users include images, videos, text, URL links, and user behaviors, among other types of data. Social network 1406 may query social network 1408 based on the customer characteristics and the customer behaviors in accordance with one or more embodiments of the present invention.

Processing proceeds at operation 1475, where social network 1406 receives a user profile ID. In some embodiments of the present invention, the user profile ID is a numeric or alphanumeric identification used to identify the user profile in social network 1406 and social network database 1408.

Processing continues at operation 1480, where social network 1406 queries for a unique ID specific to the client ID based on the user profile ID. In some embodiments of the present invention, social network 1406 performs operation 1470 at the request of the retailer backend office 1404 by providing its client ID via the application programming interface (API). In some embodiments, the user profile ID is a numeric or alphanumeric universally unique identifier (UUID) guaranteed to be unique for the matched user profile for all stored user profiles. In these and other embodiments, the social network profile for a user may be accessed via an API call using the unique ID after authenticating to social network 1406 using a corresponding client ID. Continuing the exemplary embodiment (see FIG. 18), user 1812 named Patrick has UUID A for virtual multi-tenant profile 1802, UUID B for virtual multi-tenant profile 1804, and UUID C for virtual multi-tenant profile 1806. Similarly, user 1814 named Mark has UUID X for virtual multi-tenant profile 1802, UUID Y for virtual multi-tenant profile 1804, and UUID Z for virtual multi-tenant profile 1806.

In some embodiments of the present invention, social network database 1408 and social network 1406 may be responsible to store and manages user data belong to the retailer store 1402. In these and other embodiments, social network 1406 may as part of or on behalf of retailer store 1402. In some embodiments, retailer store 1402 may be owned or controlled to a chain of stores corresponding to a parent company. In some embodiments, social network database 1408 may merge the user data collected from each store belonging to a chain of stores, or track the user data from each store independently and provide grouping for the chain of stores. For example, using customizable access control, both Retail Store X and Retail Store Y belonging to the same parent company may have access to the same data corresponding to User A.

In some embodiments of the present invention, the data belonging to a client in social network profile 1812 can be used by a different client for selected purposes. For example, Client 1 submits images and behavior corresponding to User A captured by site sensor 116 to social network 1406. In this exemplary embodiment, social network 1406 can use the data and identity patterns from Client 2 and Client 3 to identify User A. However, Client 1 may not be allowed to retrieve specific customer behavior or purchases from Client 2 or Client 3.

Processing proceeds at operation 1485, where social network 1406 receives the unique ID and sends the unique ID to retailer backend office 1404. In some embodiments of the present invention, retailer backend office 1404 and social network 1406 may access the social network profile for a user via an API call using the user profile ID or the unique ID.

Figure 15:
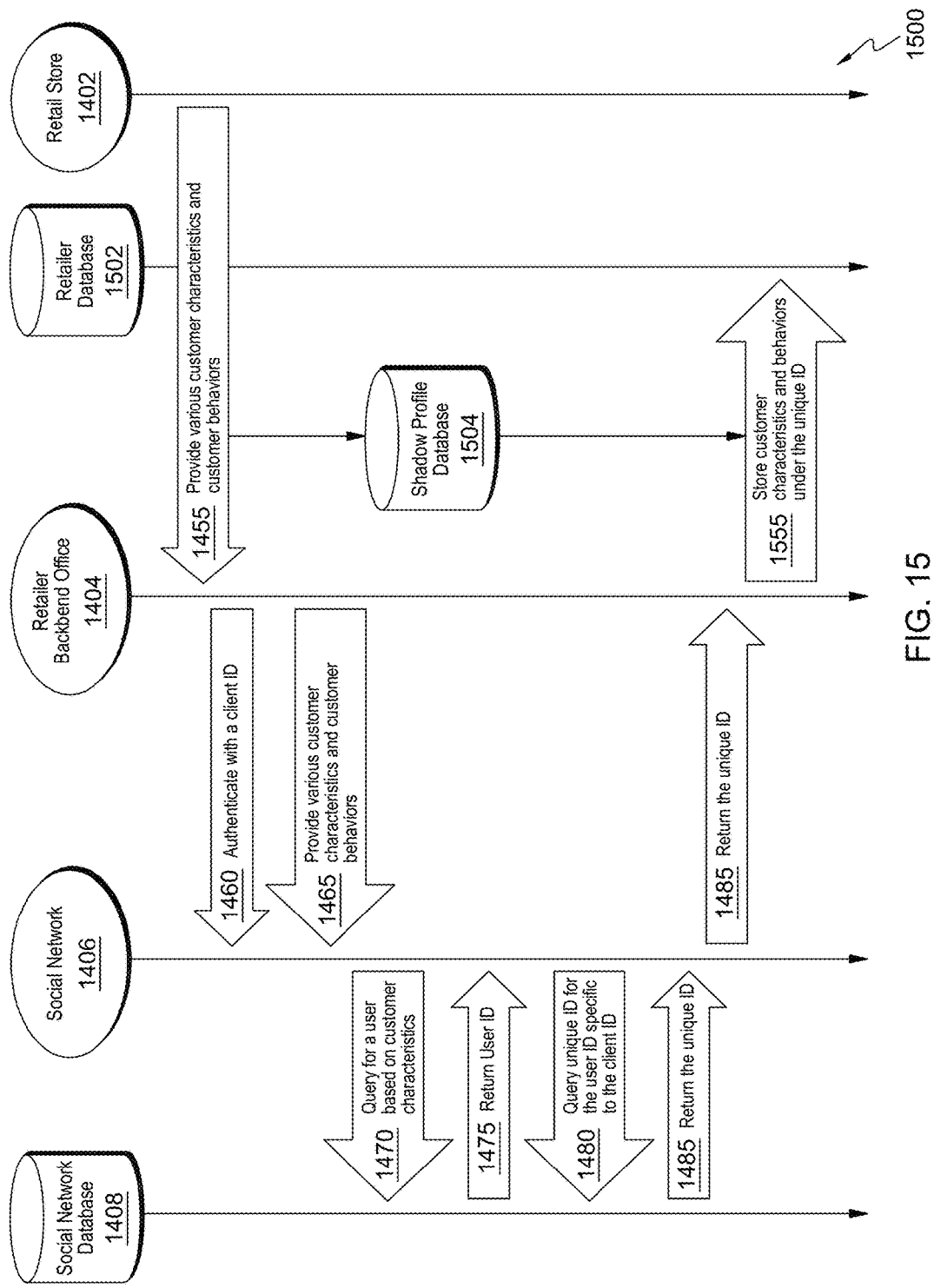
FIG. 15 is a functional block diagram and flowchart illustrating a distributed data processing environment for a passively managed customer loyalty program through the use of local profiles in a retailer database, in accordance with an embodiment of the present invention.

FIG. 15 shows an alternative embodiment of the embodiment shown in FIG. 14 for a passively managed loyalty program and a social network managed loyalty program for users in a specific location (e.g., a store or a restaurant) based on social network profiles. Referring to diagram 1500, upon completion of operation 1485 (see FIG. 14), processing continues at operation 1555, where retailer backend office 1404 receives the unique ID and stores the customer characteristics and the customer behaviors in retailer database 1502. In some embodiments of the present invention, the customer characteristics and customer behaviors are stored locally for improved querying of users that have already been identified at retail store 1402. In some embodiments, the customer characteristics and customer behaviors are protected to ensure they are not available to third parties for security reasons. In some embodiments, retailer database 1502 may be any database within any server computer for storing user profiles such as social network profiles, profiles within the brick and mortar retail store database, profiles from the online retailer database, profiles from a distributed or shared ledger, among others. In some embodiments, the customer characteristics and customer behaviors are stored in a shadow (i.e., temporary) profile database 1504 temporarily while retailer backend office 1404 has not yet received a unique ID for a user (see FIG. 19). In these embodiments, the shadow profile corresponding to a user is merged with the user profile to retailer database 1502 when a unique ID is received. In some embodiments of the present invention, the user profile may be stored in single-tenant storage based on a single retail store 1402 or multi-tenant fashion based on one or more retail stores, where each retail store 1402 is treated as a different client (see FIG. 18).

Figure 16:
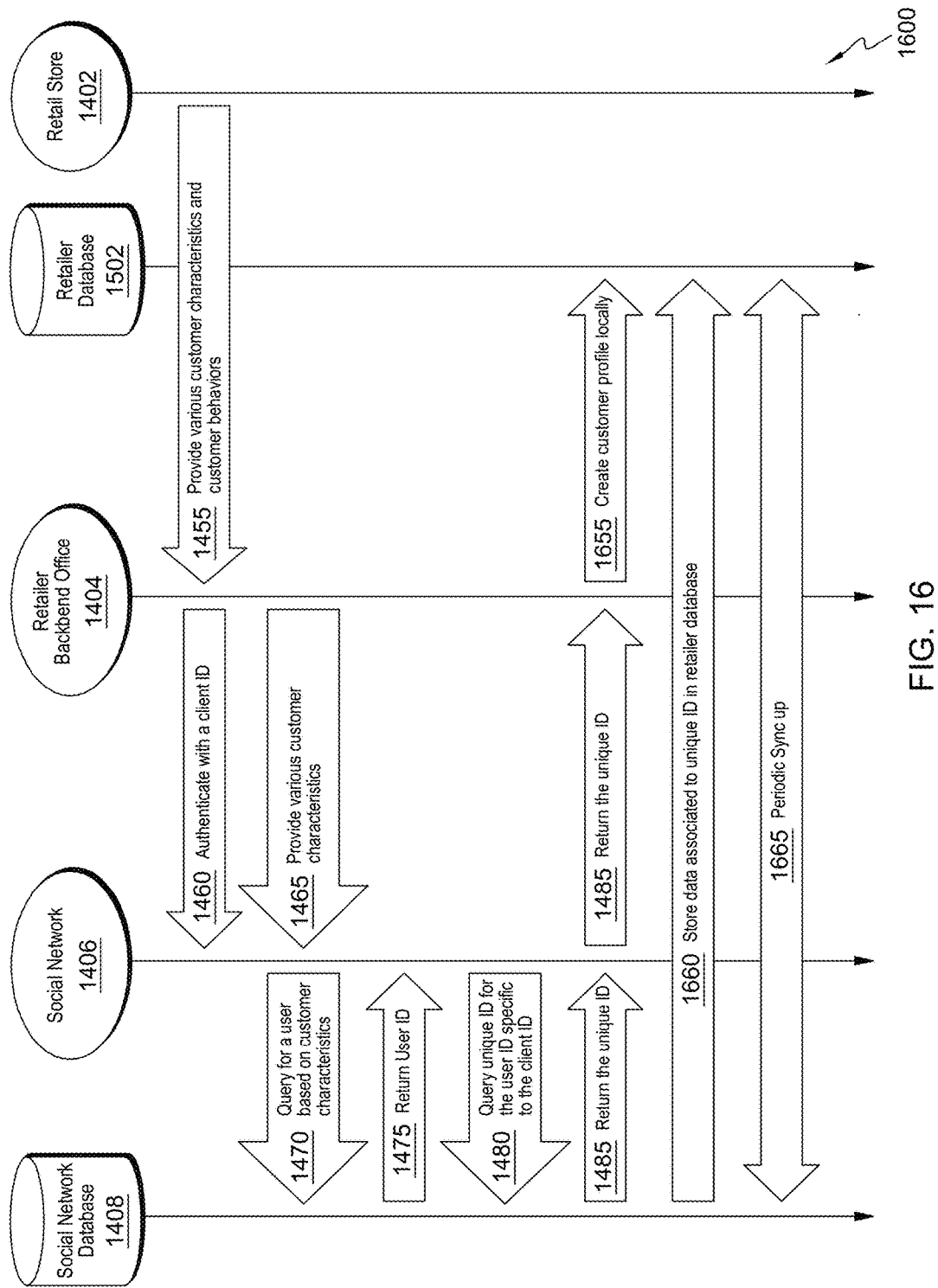
FIG. 16 is a functional block diagram and flowchart illustrating a distributed data processing environment for a passively managed customer loyalty program through the use of local profiles replicated from a social network, in accordance with an embodiment of the present invention.

FIG. 16 shows yet another alternative embodiment of the embodiment shown in FIG. 14 for a passively managed loyalty program and a social network managed loyalty program for users in a specific location (e.g., a store or a restaurant) based on social network profiles and local customer profiles. Referring to diagram 1600, upon completion of operation 1485 (see FIG. 14), processing continues at operation 1655, where retailer backend office 1404 creates a local customer profile at retailer database 1502 after receiving the unique ID for a user. In some embodiments of the present invention, the local customer profile is used for local identification of users in retail store 1402 (see FIG. 17).

Processing proceeds at operation 1660, where retailer backend office 1404 stores data associated to the unique ID for a user in retailer database 1502. In some embodiments of the present invention, retailer backend office 1404 accesses social network 1406 via an API call and downloads the user profile associated to the unique ID.

Processing continues at operation 1665, where retailer backend office 1404 performs a periodic sync up of the images and user attributes from social network database 1408. In some embodiments of the present invention, retailer backend office 1404 periodically accesses social network 1406 via an API call and updates the user profile associated to the unique ID.

Figure 17:
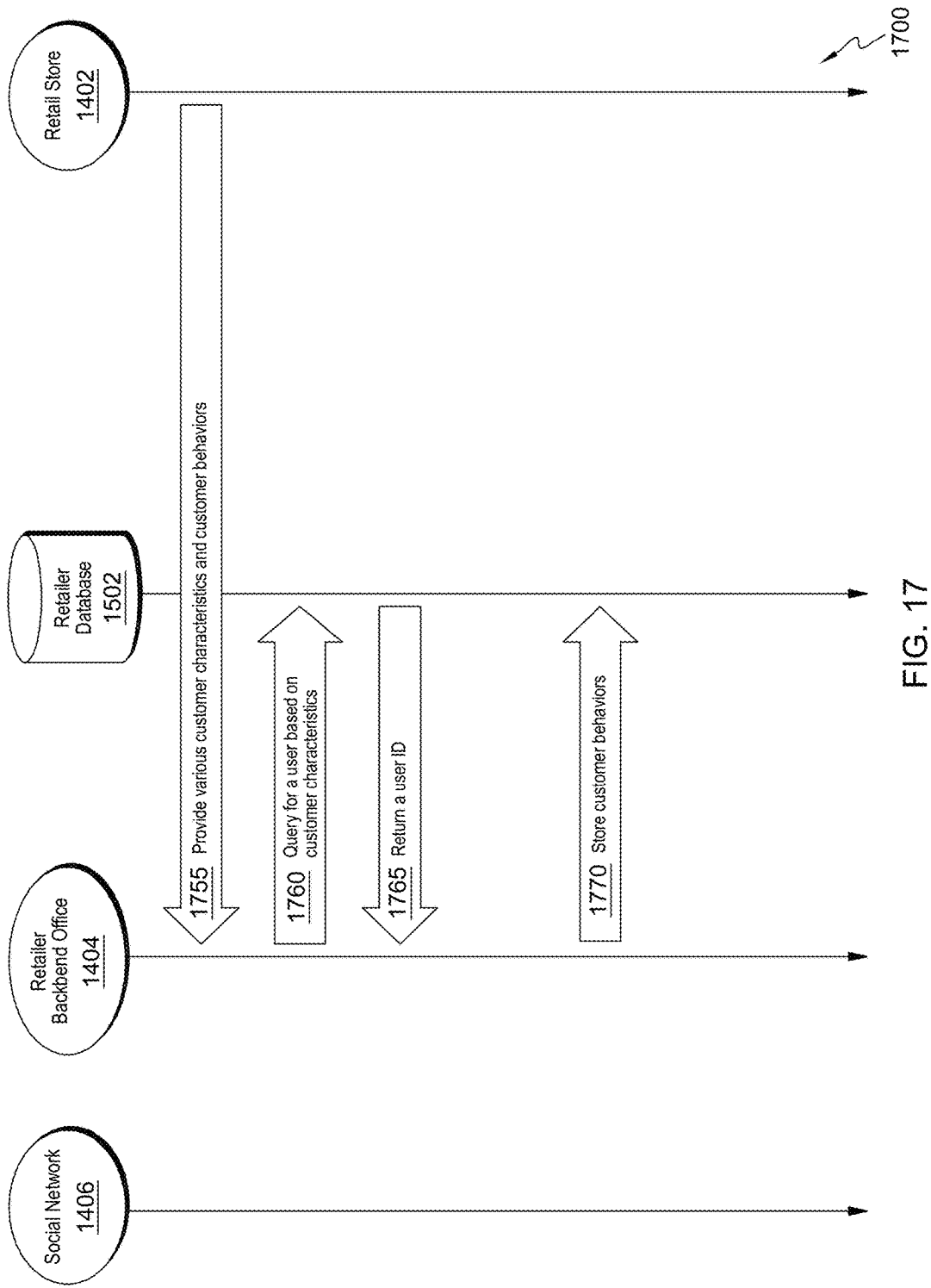
FIG. 17 is a functional block diagram and flowchart illustrating a distributed data processing environment for a passively managed customer loyalty program through the use of local profiles, in accordance with an embodiment of the present invention.

FIG. 17 shows still another embodiment of the embodiment shown in FIG. 16 for a passively managed loyalty program for users in a specific location (e.g., a store or a restaurant) based on social network profiles stored in a retailer database. Referring to diagram 1700, processing begins at operation 1755, where retail store 1402 provides customer characteristics (i.e., user attributes) and customer behaviors (i.e., user behaviors) for processing by retailer backend office 1404. In some embodiments of the present invention, one or more site sensors 116 at retail store 1402 capture a set on input images and determine user attributes and user behaviors for one or more users. In some embodiments of the present invention, receiving the user attributes (e.g., identity patterns) and the user behaviors for a user may be based on one or more embodiments described in this disclosure.

Processing continues at operation 1760, where retailer backend office 1404 queries a retailer database 1502 for a user based on customer characteristics and customer behaviors. Retailer backend office 1404 may query retailer database 1502 based on the customer characteristics and the customer behaviors in accordance with one or more embodiments of the present invention.

Processing proceeds at operation 1765, where retailer backend office 1404 receives a user ID from retailer database 1502. In some embodiments of the present invention, the user profile ID is a numeric or alphanumeric identification used to identify the user profile in retailer backend office 1404 and retailer database 1502.

Processing continues at operation 1770, where retailer backend office 1404 stores customer behaviors and customer characteristics on retailer database 1502. In some embodiments of the present invention, the customer characteristics and customer behaviors are stored locally for improved querying of users that have already been identified at retail store 1402. In some embodiments, the customer characteristics and customer behaviors are protected to ensure they are not available to third parties for security reasons. In some embodiments, the customer characteristics and customer behaviors are stored locally for improved querying of users that have already been identified at retail store 1402. In some embodiments, retailer database 1502 may be any database within any server computer for storing user profiles such as social network profiles, profiles within the brick and mortar retail store database, profiles from the online retailer database, profiles from a distributed digital ledger, among others. In some embodiments, the customer characteristics and customer behaviors are stored in a shadow (i.e., temporary) profile database 1504 temporarily while retailer backend office 1404 has not yet received a unique ID for a user (see FIG. 19). In these embodiments, the shadow profile corresponding to a user is merged with the user profile to retailer database 1502 when a unique ID is received (i.e., the shadow profile collected sufficient information and the identity of the user can be determined). In some embodiments of the present invention, the user profile may be stored in single-tenant storage based on a single retail store 1402 or multi-tenant fashion based on one or more retail stores, where each retail store 1402 is treated as a different client (see FIG. 18).

Figure 19:
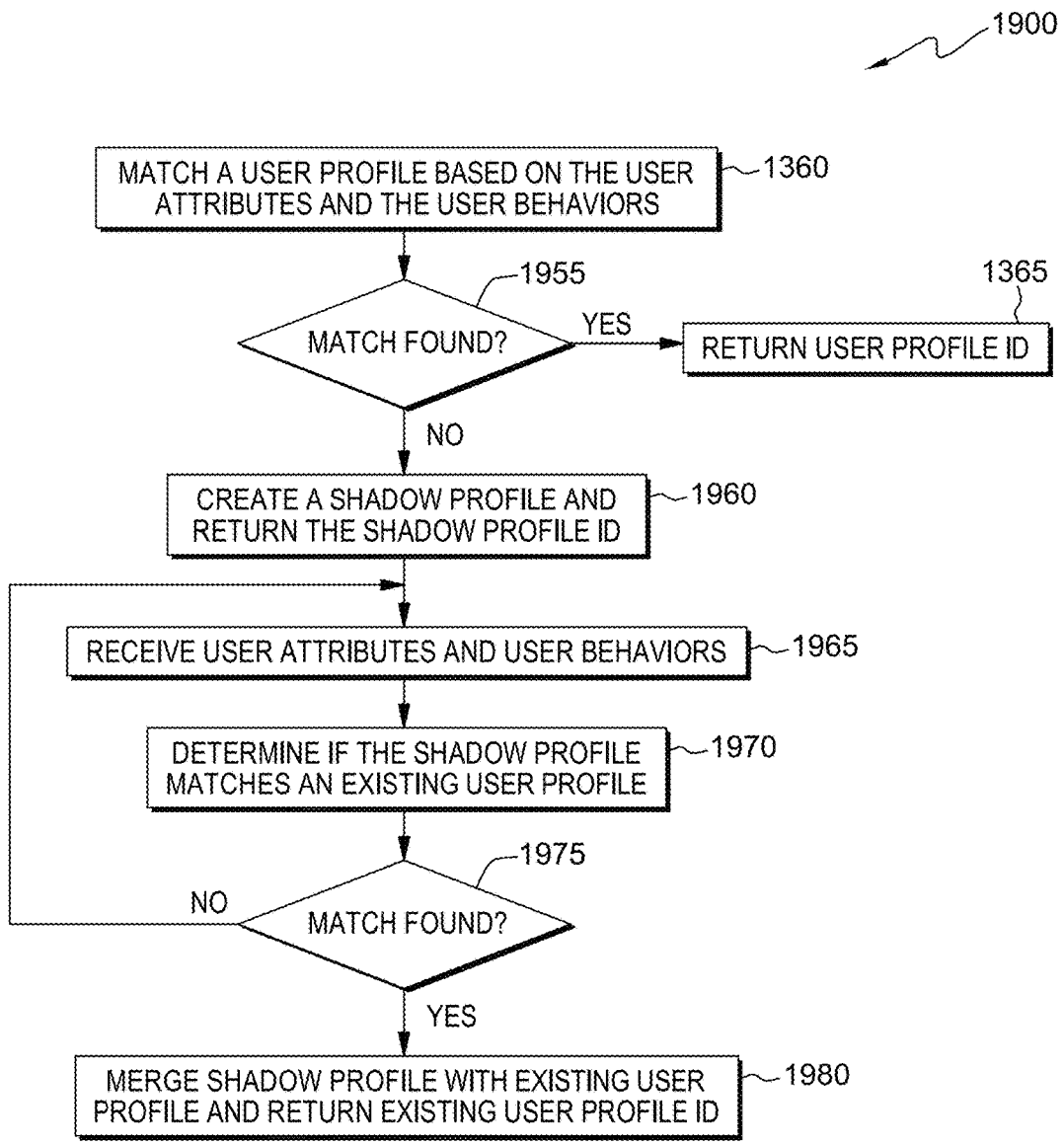
FIG. 19 is a flowchart depicting operational steps of a user identification program, on a server computer within the distributed data processing environment of FIG. 1, for storage of customer characteristics and behaviors for a passively managed customer loyalty program through the use of shadow profiles, in accordance with an embodiment of the present invention.

User identification program 106 is depicted and described in further detail with respect to FIG. 19. Referring to flowchart 1900, user identification program 106 provides a passively managed loyalty program for users in a specific location (e.g., a store or a restaurant) based on shadow (i.e., temporary) profiles while existing user profiles are identified in a social network. In other embodiments, the customer characteristics and customer behaviors are stored in a shadow (i.e., temporary) profile while the corresponding customer has not been identified or associated with a user profile. In these embodiments, the shadow profile corresponding to a user is merged with the user profile when the customer is identified.

Processing begins at operation 1360, where user identification program 106 queries for a user profile based on the user attributes and the user behaviors. In some embodiments of the present invention, user identification program 106 queries one or more user profiles successively to find a matching user. In some embodiments of the present invention, querying for a user profile may be based on one or more embodiments described in this disclosure.

If a match is found (operation 1955, "yes" branch), processing proceeds at operation 1365, where user identification program 106 returns the user profile ID matching the user attributes and the user behavior. If a match is not found (operation 1955, "no" branch), processing continues at operation 1960, where user identification program 106 creates a shadow profile for the user. In some embodiments of the present invention, the shadow profile is a temporary profile for a user that does not have a stored user profile in database 108 or social media sources 118. In other embodiments, the shadow profile is a temporary profile for a user that has not yet been matched with a stored user profile based on the user attributes and the user behaviors.

Processing proceeds at operation 1965, where user identification program 106 receives user attributes and user behaviors. In some embodiments of the present invention, user identification program 106 continues receiving user attributes and user behaviors corresponding to the shadow profile. In some embodiments of the present invention, receiving the user attributes (e.g., identity patterns) and the user behaviors for a user may be based on one or more embodiments described in this disclosure.

Processing continues at operation 1970, where user identification program 106 determines if the shadow profile matches an existing user profile. In some embodiments of the present invention, determining if the shadow profile matches an existing user profile may be performed in accordance to one or more embodiments of the present disclosure. If a match is not found (operation 1975, "no" branch), processing proceeds at operation 1965, where user identification program 106 further receives user attributes and user behaviors. If a match is found (operation 1975, "yes" branch), processing proceeds at operation 1980, where user identification program 106 merges the shadow profile with the existing user profile and returns the profile ID. In some embodiments of the present invention, the user attributes and user behaviors are stored in the existing user profile. In other embodiments, the user attributes and user behaviors in the shadow profile are compared to the user attributes and user behaviors in the existing user profile. In yet other embodiments, selection of the user attributes and user behaviors that will be stored in the existing user profile may be performed in accordance to one or more embodiments described in this disclosure.

Figure 20:
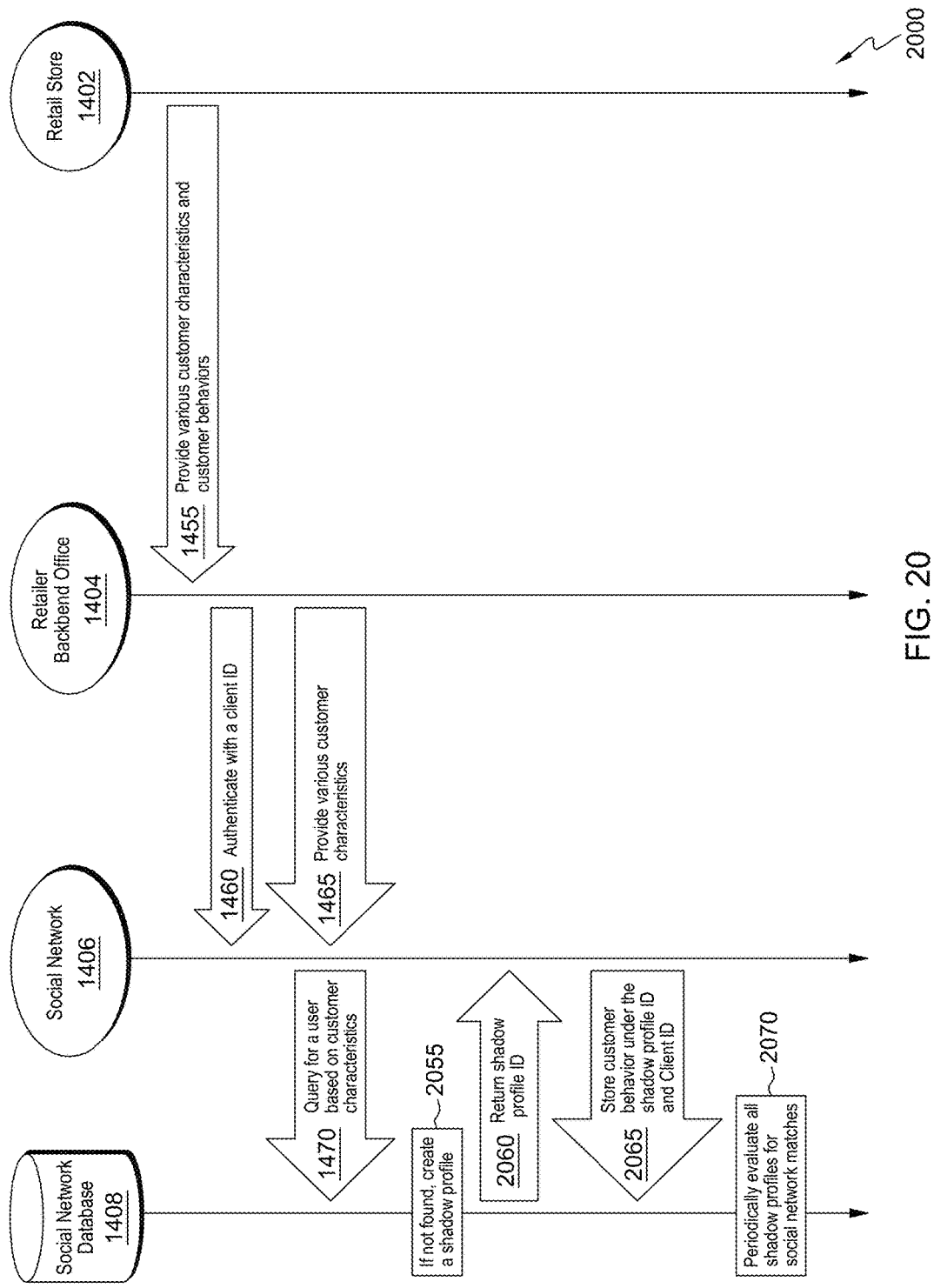
FIG. 20 is a functional block diagram and flowchart illustrating a distributed data processing environment for storage of customer characteristics and behaviors for a passively managed customer loyalty program through the use of shadow profiles, in accordance with an embodiment of the present invention.

FIG. 20 shows still another alternative embodiment of the embodiment shown in FIG. 14 for a passively managed loyalty program for users in a specific location (e.g., a store or a restaurant) based on shadow profiles. Referring to diagram 2000, upon completion of operation 1470 (see FIG. 14), processing continues at operation 2055, where social network 1406 creates a shadow profile at social network database 1408 if no user matches the customer characteristics and the customer behaviors. In some embodiments of the present invention, the customer characteristics and customer behaviors are stored in the shadow (i.e., temporary) profile while the corresponding customer has not been identified or associated with a user profile. In some embodiments, the shadow profile is created for users that have no known identity and/or users without a shadow profile.

Processing proceeds at operation 2060, where social network 1406 receives the shadow profile ID from social network database 1408. In some embodiments of the present invention, the shadow profile ID is a numeric or alphanumeric unique identifier (UID) guaranteed to be unique for the matched user profile within a specific client (e.g., a database for a specific retail store) or a numeric or alphanumeric universally unique identifier (UUID) guaranteed to be unique for the matched user profile. In some embodiments, the shadow profile ID corresponds to a new shadow profile created for a user that without a known identity and for which a shadow profile has not yet been created. In other embodiments, the shadow profile ID corresponds to an existing shadow profile for which there is no known user identity.

Processing continues at operation 2065, where social network 1406 stores the customer characteristics and the customer behaviors under the shadow profile ID and the client ID. In some embodiments of the present invention, social network 1406 stores the customer characteristics and customer behaviors in the shadow profile for future identification of users that do not currently have an associated user profile in social network 1406. In these embodiments, the user will continue to be identified based the customer characteristics and customer behaviors.

Processing proceeds at operation 2070, where social network 1406 periodically evaluates all shadow profiles to find a matching social network profile. In some embodiments of the present invention, once the user has been associated with a user profile in social network 1406 (e.g., the user registers an account in the social network 1406 or signs up for the loyalty program at retail store 1402) all the customer characteristics and customer behaviors are copied to the user profile and the shadow profile is deleted. In other embodiments, the shadow profile and the user profile are compared for selection of customer characteristics and customer behaviors that help identify the user more efficiently. In some embodiments, selecting the customer characteristics (e.g., identity patterns) and the customer behaviors for a user may be based on the user profile or the shadow profile and/or one or more embodiments described in this disclosure.

Figure 21:
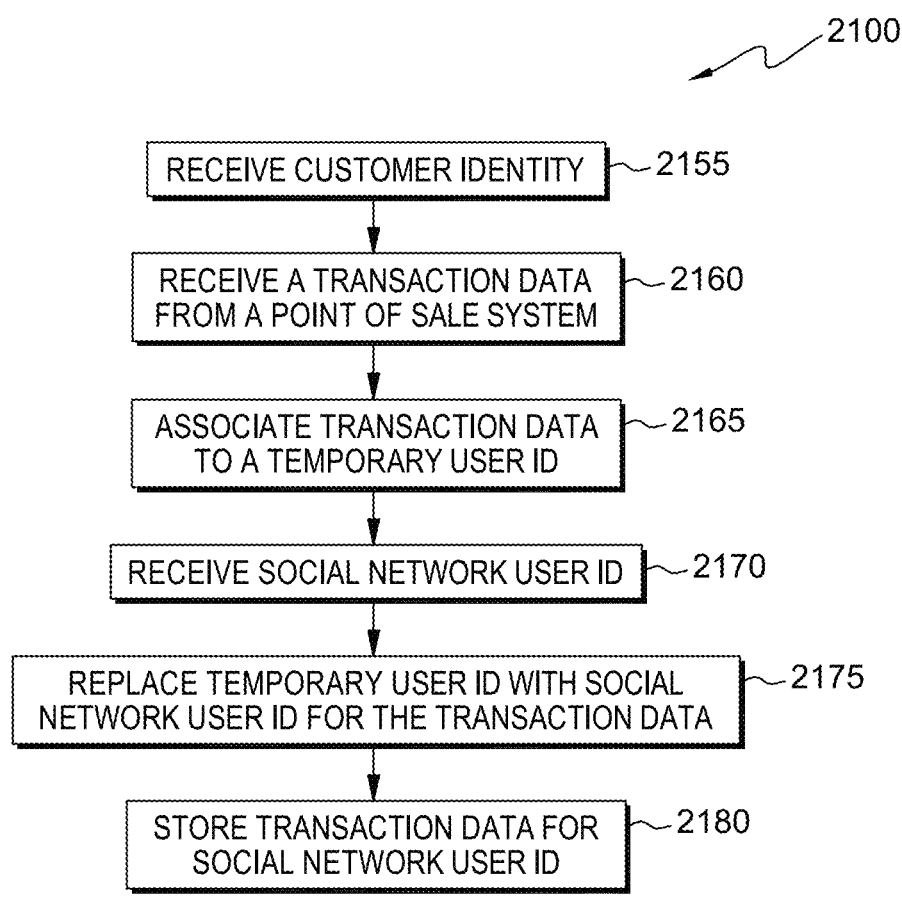
FIG. 21 is a flowchart depicting operational steps of a user identification program, on a server computer within the distributed data processing environment of FIG. 1, for storage of point of sale transactions related to a passively managed customer loyalty program, in accordance with an embodiment of the present invention.

User identification program 106 is depicted and described in further detail with respect to FIG. 21. Referring to flowchart 2100, user identification program 106 provides a passively managed loyalty program including storing transactions made at a point of sale (POS) system.

Processing begins at operation 2155, where user identification program 106 receives customer identity for a user. In some embodiments of the present invention, the customer identity may include customer characteristics and customer behaviors. In other embodiments, receiving the customer identity for a user may be based on one or more embodiments described in this disclosure.

Processing continues at operation 2160, where user identification program 106 receives a transaction data for the user from a point of sale (POS) system. In some embodiments of the present invention, any transactions performed at the POS are logged at a backend service for determining award points and/or advertisements for the user. In some embodiments, the transaction data may include the following data, among others: (a) list of items; (b) price of items; (c) coupons or offers applied, if any; (d) total price of sale; (e) method of payment; (f) time and date.

Processing proceeds at operation 2165, where user identification program 106 associates the transaction data to a temporary user ID. In some embodiments of the present invention, a temporary user ID is assigned to the transaction data to log the transaction data for the user while the user is identified in asynchronous form.

Processing continues at operation 2170, where user identification program 106 receives a social network user ID associated to the user. In some embodiments of the present invention, requests and asynchronously receives the social network user ID associated to the user. In these embodiments, the transaction data is associated to a temporary user ID while the social network user ID has not yet been received.

Processing proceeds at operation 2175, where user identification program 106 replaces the temporary user ID with the social network user ID. In some embodiments of the present invention, the temporary user ID is replaced with the social network user ID when it becomes available.

Processing continues at operation 2180, where user identification program 106 stores the transaction data for user ID. In some embodiments of the present invention, once the transaction data is associated to the social network user ID, user identification program 106 may store the transaction in database 108 as part of the customer characteristics and the customer behaviors used to identify the user and/or provide analytics for the user.

Figure 22:
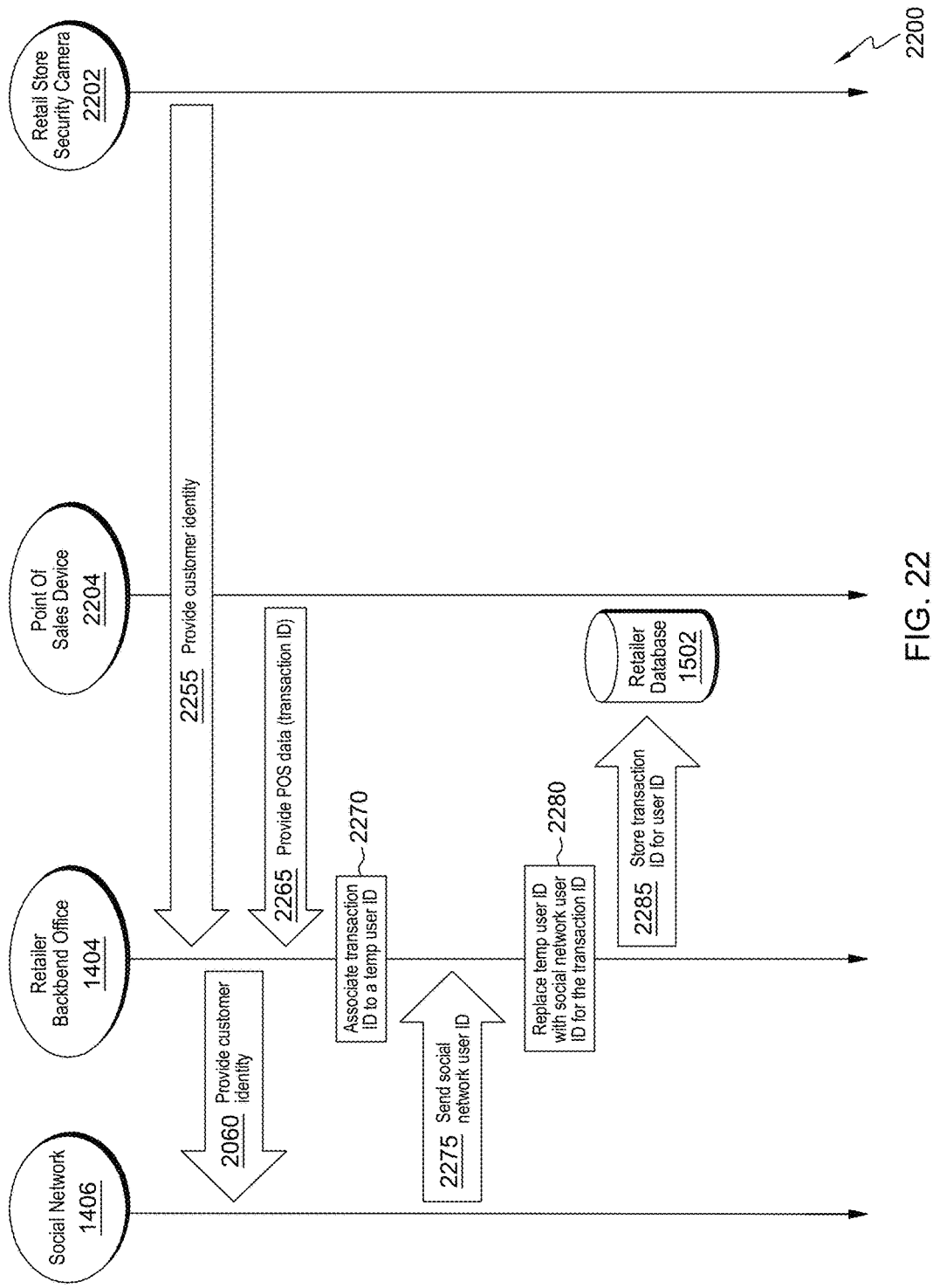
FIG. 22 is a functional block diagram and flowchart illustrating a distributed data processing environment for storage of customer characteristics and behaviors for storage of point of sale transactions related to a passively managed customer loyalty program, in accordance with an embodiment of the present invention.

FIG. 22 shows an embodiment for a passively managed loyalty program and a social network managed loyalty program for users in a specific location (e.g., a store or a restaurant) that associates transactions made at a point of sale device with a social network profile. Referring to diagram 2200, processing begins at operation 2255, where retailer backend office 1404 receives a customer identity from a retail store camera 2202. In some embodiments of the present invention, receiving the customer identity for a user may be based on one or more embodiments described in this disclosure.

Processing continues at operation 2260, where retailer backend office 1404 sends the customer identity to social network 1406 for identification of the user. In some embodiments of the present invention, social network 1406 may require authentication of retailer backend office 1404 via an API call. In these and other embodiments, retailer backend office 1404 asynchronously requests the social network user ID from social network 1406 and continues to process the transaction data at POS 2204.

Processing proceeds at operation 2265, where retailer backend office 1404 receives POS data, including a transaction ID, from POS 2204. In some embodiments of the present invention, the transaction data may include the following data, among others: (a) list of items; (b) price of items; (c) coupons or offers applied, if any; (d) total price of sale; (e) method of payment; (f) time and date.

Processing continues at operation 2270, where retailer backend office 1404 associates the transaction ID to a temporary user ID. In some embodiments of the present invention, a temporary user ID is assigned to the transaction data to log the transaction data for the user while the user is identified in asynchronous form.

Processing proceeds at operation 2275, where retailer backend office 1404 receives a social network user ID for the user from social network 1406. In some embodiments of the present invention, requests and asynchronously receives the social network user ID associated to the user. In these embodiments, the transaction data is associated to a temporary user ID while the social network user ID has not yet been received.

Processing continues at operation 2280, where retailer backend office 1404 replaces the temporary user ID with the social network user ID for the transaction ID. In some embodiments of the present invention, the temporary user ID is replaced with the social network user ID when it becomes available. In these embodiments, replacing the temporary user ID with the social network user ID allows identification of the transactions made by the user.

Processing proceeds at operation 2285, where retailer backend office 1404 stores a transaction ID for the user ID in retailer database 1502. In some embodiments of the present invention, once the transaction data is associated to the social network user ID, user identification program 106 may store the transaction in retailer database 1502 as part of the customer characteristics and the customer behaviors used to identify the user and/or provide analytics for the user.

Figure 23:
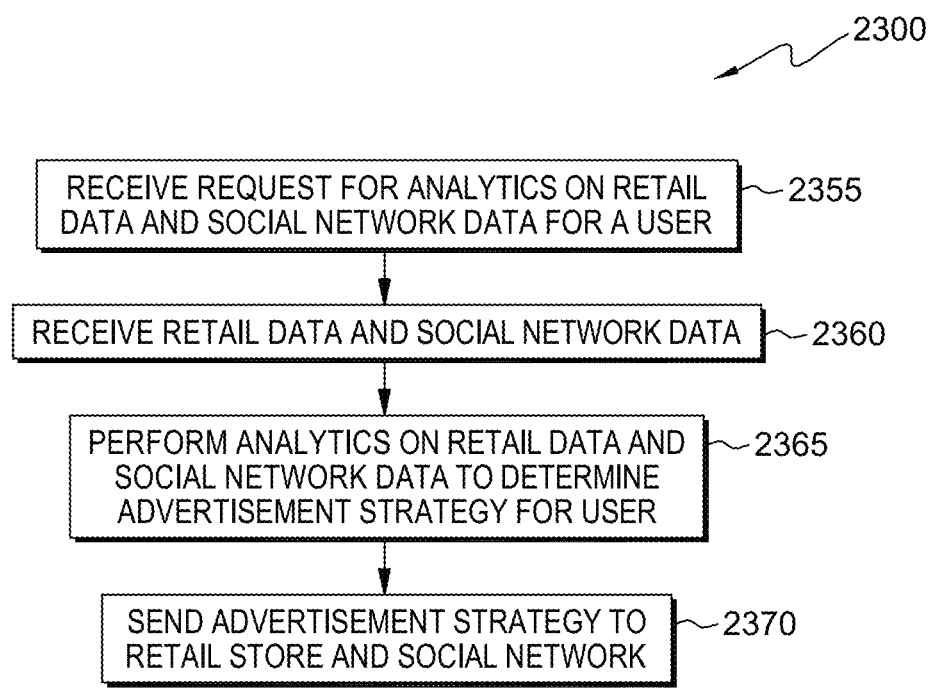
FIG. 23 is a flowchart depicting operational steps of a user identification program, on a server computer within the distributed data processing environment of FIG. 1, for data analytics related to a passively managed customer loyalty program, in accordance with an embodiment of the present invention.

User identification program 106 is depicted and described in further detail with respect to FIG. 23. Referring to flowchart 2300, user identification program 106 provides a passively managed loyalty program including analytics of retail data and social network data for users.

Processing begins at operation 2355, where user identification program 106 receives a request for analytics on retail data from a retail store and social network data from a social network for a user. In some embodiments of the present invention, user identification program 106 performs one or more analytics of the customer characteristics and customer behaviors associated to the users to determine one or more advertisement strategies.

Processing continues at operation 2360, where user identification program 106 receives retail data and social network data. In some embodiments of the present invention, user identification program 106 receives data stored at database 108 related to retail data (e.g., customer characteristics and customer behaviors at one or more retail stores) and social network data (e.g., followed brands, photographed items, items placed in shopping carts, among others).

Processing proceeds at operation 2365, where user identification program 106 performs analytics on retail data and social network data to determine an advertisement strategy for a user. In some embodiments of the present invention, analytics may be performed based on: (i) time spent at specific departments; (ii) time spent looking at specific items; (iii) items bought; (iv) items returned; (v) items placed in shopping cart; (vi) items liked or searched for in a social network; (vii) items saved or photographed in a social network; (viii) specific brands followed in social networks; among other factors.

Processing continues at operation 2370, where user identification program 106 sends the advertisement strategy to the retail store and the social network. In some embodiments of the present invention, the advertisement strategy is sent to one or more retail stores, one or more mobile devices for the user, among other devices. In some embodiments, the advertisement strategy may include text, picture, videos, coupons, buy more and save campaigns, subscription for future shipments, installation of retailer mobile apps, additional offerings such as delivery to home, and/or other marketing and advertisement mechanism. In some embodiments, the advertisement strategy may be a real-time strategy (e.g., by text messaging or instant notification on mobile device) or it may be a delayed strategy (e.g., by showing ads on a search engine at a future time).

Figure 24:
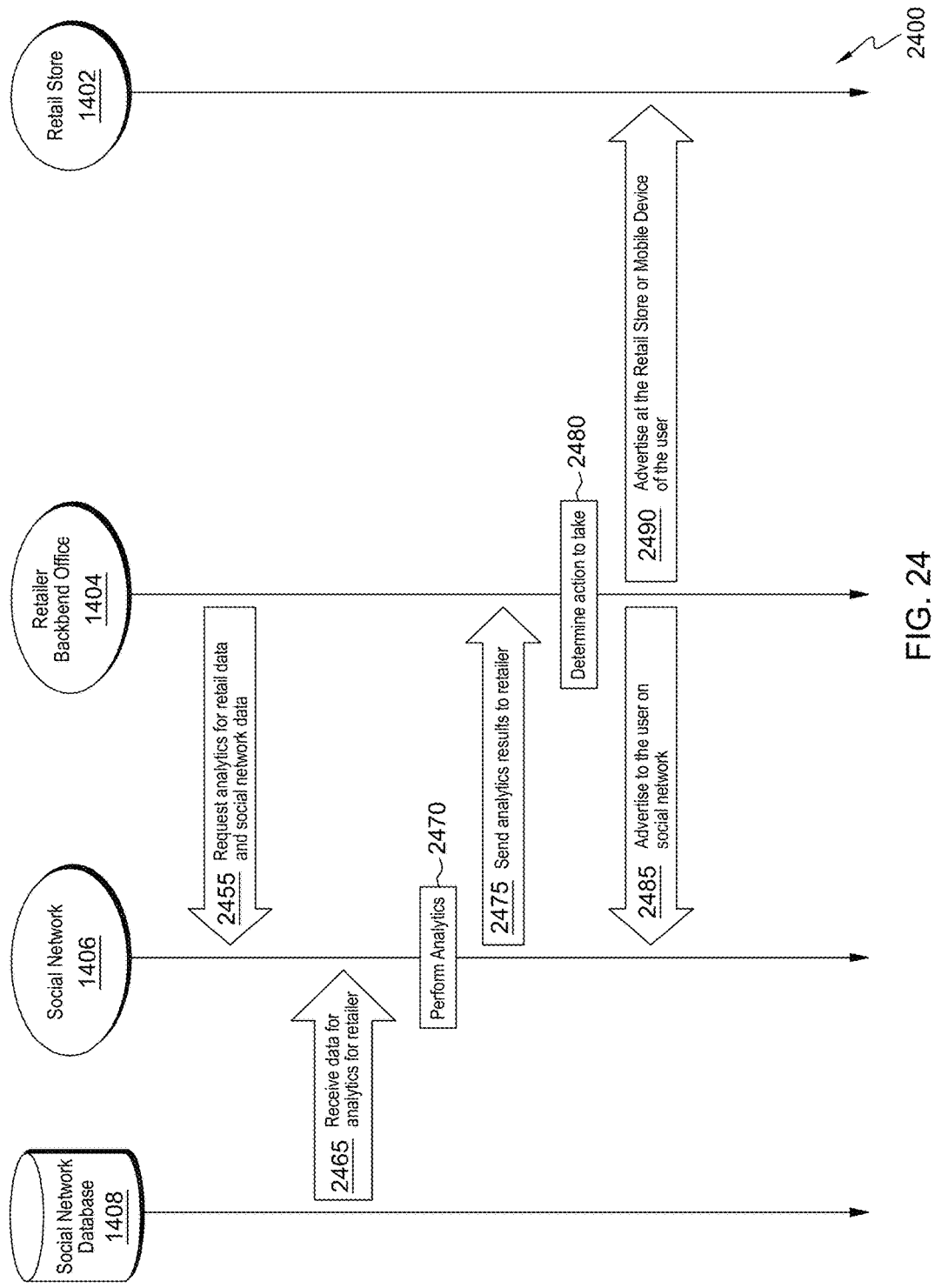
FIG. 24 is a functional block diagram and flowchart illustrating a distributed data processing environment for storage of customer characteristics and behaviors for data analytics related to a passively managed customer loyalty program, in accordance with an embodiment of the present invention.

FIG. 24 shows an embodiment of a passively managed loyalty program for users in a specific location (e.g., a store or a restaurant) that provides advertisement strategies based on social network profiles. Processing begins at operation 2455, where retailer backend office 1404 sends a request for analytics of retail data to social network 1406. In some embodiments of the present invention, user identification program 106 performs one or more analytics of the customer characteristics and customer behaviors associated to the users to determine one or more advertisement strategies.

Processing proceeds at operation 2465, where social network 1406 receives retail data and social network data from social network database 1408. In some embodiments of the present invention, social network 1406 may also receive retail data from retailer database 1502. In some embodiments, retail data may include, for example, customer characteristics and customer behaviors at one or more retail stores, and social network data may include, for example, followed brands, photographed items, items placed in shopping carts, among others.

Processing continues at operation 2470, where social network 1406 performs analytics to develop an advertising strategy based on the retail data and the social network data. In some embodiments of the present invention, analytics may be performed based on: (i) time spent at specific departments; (ii) time spent looking at specific items; (iii) items bought; (iv) items returned; (v) items placed in shopping cart; (vi) items liked or searched for in a social network; (vii) items saved or photographed in a social network; (viii) specific brands followed in social networks; among other factors.

Processing proceeds at operation 2475, where social network 1406 sends the analytics results to retailer backend office 1404. In some embodiments of the present invention, the analytics results are directed to determine an advertising strategy based on the retail data and the social network data.

Processing continues at operation 2480, where retailer backend office 1404 determines an advertising strategy. In some embodiments of the present invention, the advertising strategy comprises items and/or offers that the user may be interested in based on past behavior.

Processing continues at operation 2485, where retailer backend office 1404 requests advertising to the user on social network 1406.

Processing continues at operation 2490, where retailer backend office 1404 requests advertising at retail store 1402. In some embodiments of the present invention, retailer backend office 1404 may also request advertising at mobile device 110 (see FIG. 1). In some embodiments, advertising at retail store 1402 may include advertisements or offers in a receipt or similar manner.

Figure 25:
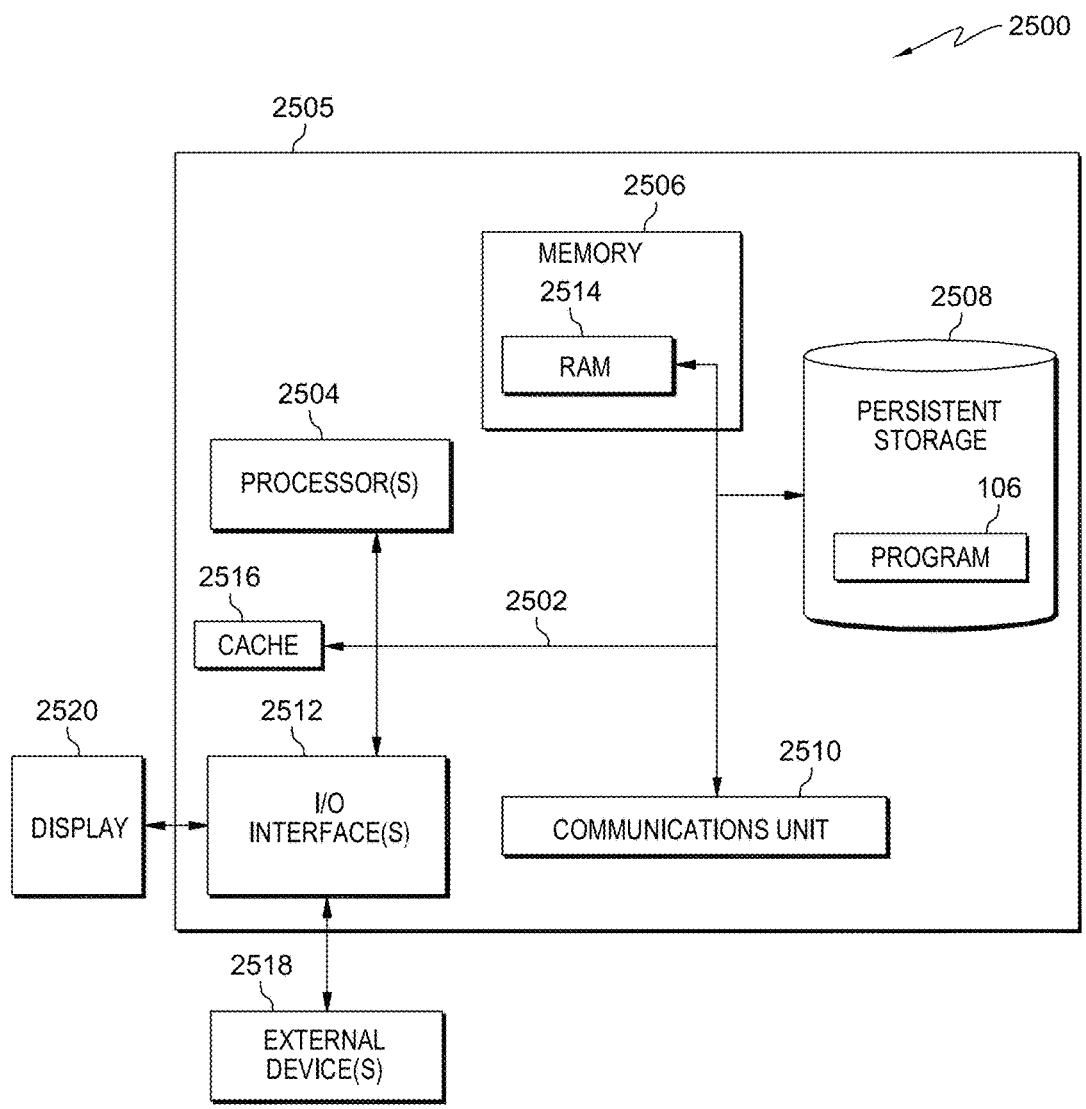
FIG. 25 depicts a block diagram of components of the server computer executing the user identification program within the distributed data processing environment of FIG. 1, in accordance with an embodiment of the present invention.

FIG. 25 depicts block diagram 2500 of components of server computer 104 within distributed data processing environment 100 of FIG. 1, in accordance with an embodiment of the present invention. It should be appreciated that FIG. 25 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computing device 2505 and server computer 104 include communications fabric 2502, which provides communications between computer processor(s) 2504, memory 2506, persistent storage 2508, communications unit 2510, and input/output (I/O) interface(s) 2512.

Communications fabric 2502 can be implemented with any architecture designed for passing data and/or control information between processors (such as microprocessors, communications and network processors, etc.), system memory, peripheral devices, and any other hardware components within a system. For example, communications fabric 2502 can be implemented with one or more buses.

Memory 2506 and persistent storage 2508 are computer-readable storage media. In this embodiment, memory 2506 includes random access memory (RAM) 2514 and cache memory 2516. In general, memory 2506 can include any suitable volatile or non-volatile computer-readable storage media.

User identification program 106 is stored in persistent storage 2508 for execution by one or more of the respective computer processors 2504 via one or more memories of memory 2506. In this embodiment, persistent storage 2508 includes a magnetic hard disk drive. Alternatively, or in addition to a magnetic hard disk drive, persistent storage 2508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 2508 may also be removable. For example, a removable hard drive may be used for persistent storage 2508. Other examples include optical and magnetic disks, thumb drives, and smart cards that are inserted into a drive for transfer onto another computer-readable storage medium that is also part of persistent storage 2508.

Communications unit 2510, in these examples, provides for communications with other data processing systems or devices, including resources of distributed data processing environment 100. In these examples, communications unit 2510 includes one or more network interface cards. Communications unit 2510 may provide communications through the use of either or both physical and wireless communications links. User identification program 106 may be downloaded to persistent storage 2508 through communications unit 2510.

I/O interface(s) 2512 allows for input and output of data with other devices that may be accessible to computing device 2505 and server computer 104, such as mobile device 110, site sensors 116, social media sources 118, and other computing devices (not shown). For example, I/O interface 2512 may provide a connection to external devices 2518 such as a keyboard, keypad, a touch screen, and/or some other suitable input device. External devices 2518 can also include portable computer-readable storage media such as, for example, thumb drives, portable optical or magnetic disks, and memory cards. Software and data used to practice embodiments of the present invention, e.g., user identification program 106 can be stored on such portable computer-readable storage media and can be loaded onto persistent storage 2508 via I/O interface(s) 2512. I/O interface(s) 2512 also connect to a display 2520.

Display 2520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more processors, a set of input images corresponding to a period of time, wherein each input image in the set of input images corresponds to a specific time within the period of time;
   identifying, by one or more processors, a first user in the set of input images;
   determining, by one or more processors, a user identity pattern based on the set of input images, wherein the user identity pattern includes multiple instances of at least one physical characteristic of the first user over the period of time, and wherein the first user can be uniquely identified based on the user identity pattern; and
   associating, by one or more processors, the set of input images and the user identity pattern with a first user profile for the first user, by matching the set of input images and the user identity pattern to the first user profile in a set of user profiles and, in response, updating the first user profile based on the user identity pattern,
   wherein the matching comprises:
      selecting a current user profile from the set of user profiles for matching the set of input images and the user identity pattern;
      comparing the set of input images and the user identity pattern with the current user profile;
      determining a combined confidence score from a plurality of images in the current user profile, the user identity pattern, and a user behavior based on the user identity pattern; and
      responsive to the combined confidence score being higher or equal to a predetermined threshold, identifying the current user profile as the first user profile for the first user, wherein the predetermined threshold is automatically determined based on a plurality of user identity patterns.

2. The method of claim 1, wherein the at least one physical characteristic comprises: (a) body shape; (b) clothing color; (c) clothing patterns; (d) physical appearance; (e) gait; and (f) accessories.

3. The method of claim 1, wherein the user behavior comprises: (a) interaction with objects and (b) time spent at a specific location.

4. A computer program product, comprising:
   one or more computer readable storage devices and program instructions stored on the one or more computer readable storage devices, the stored program instructions comprising:
      program instructions to receive a set of input images corresponding to a period of time, wherein each input image in the set of input images corresponds to a specific time within the period of time;
      program instructions to identify a first user in the set of input images;
      program instructions to determine a user identity pattern based on the set of input images, wherein the user identity pattern includes multiple instances of at least one physical characteristic of the first user over the period of time and wherein the first user can be uniquely identified based on the user identity pattern;
      program instructions to determine a user behavior based on the user identity pattern; and
      program instructions to associate the set of input images and the user identity pattern with a first user profile for the first user, by matching the set of input images and the user identity pattern to the first user profile in a set of user profiles and, in response, updating the first user profile based on the user identity pattern,
   wherein the matching comprises:
      selecting a current user profile from the set of user profiles for matching the set of input images and the user identity pattern;
      comparing the set of input images and the user identity pattern with the current user profile;
      determining a combined confidence score from a plurality of images in the current user profile, the user identity pattern, and the user behavior; and
      responsive to the combined confidence score being higher or equal to a predetermined threshold, identifying the current user profile as the first user profile for the first user, wherein the predetermined threshold is automatically determined based on a plurality of user identity patterns.

5. The computer program product of claim 4, wherein the at least one physical characteristic comprises: (a) body shape; (b) clothing color; (c) clothing patterns; (d) physical appearance; (e) gait; and (f) accessories.

6. The computer program product of claim 4, wherein the user behavior comprises: (a) interaction with objects; and (b) time spent at a specific location.

7. A computer system, comprising:
one or more computer processors;
one or more computer readable storage devices;
program instructions stored on the one or more computer readable storage devices for execution by at least one of the one or more computer processors, the stored program instructions comprising:
   program instructions to receive a set of input images corresponding to a period of time, wherein each input image in the set of input images corresponds to a specific time within the period of time;
   program instructions to identify a first user in the set of input images;
   program instructions to determine a user identity pattern based on the set of input images, wherein the user identity pattern includes multiple instances of at least one physical characteristic of the first user over the period of time and wherein the first user can be uniquely identified based on the user identity pattern;
   program instructions to determine a user behavior based on the user identity pattern; and
   program instructions to associate the set of input images and the user identity pattern with a first user profile for the first user, by matching the set of input images and the user identity pattern to the first user profile in a set of user profiles and, in response, updating the first user profile based on the user identity pattern,
wherein the matching comprises:
   selecting a current user profile from the set of user profiles for matching the set of input images and the user identity pattern;
   comparing the set of input images and the user identity pattern with the current user profile;
   determining a combined confidence score from a plurality of images in the current user profile, the user identity pattern, and the user behavior; and
   responsive to the combined confidence score being higher or equal to a predetermined threshold, identifying the current user profile as the first user profile for the first user, wherein the predetermined threshold is automatically determined based on a plurality of user identity patterns.

8. The computer system of claim 7, wherein the at least one physical characteristic comprises: (a) body shape; (b) clothing color; (c) clothing patterns; (d) physical appearance; (e) gait; and (f) accessories.

9. The computer system of claim 7, wherein the user behavior comprises: (a) interaction with objects; and (b) time spent at a specific location.

* * * * *